United States Patent
Herz et al.

(10) Patent No.: US 11,343,420 B1
(45) Date of Patent: May 24, 2022

(54) SYSTEMS AND METHODS FOR EYE-BASED EXTERNAL CAMERA SELECTION AND CONTROL

(71) Applicant: Tectus Corporation, Saratoga, CA (US)

(72) Inventors: Scott Herz, Saratoga, CA (US); Dominic Philip Haine, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 17/217,866

(22) Filed: Mar. 30, 2021

(51) Int. Cl.
| | |
|---|---|
| *H04N 5/232* | (2006.01) |
| *G06F 3/01* | (2006.01) |
| *H04N 9/31* | (2006.01) |
| *H04N 7/18* | (2006.01) |
| *G02C 11/00* | (2006.01) |
| *G06F 3/0485* | (2022.01) |
| *G06F 3/04817* | (2022.01) |

(52) U.S. Cl.
CPC ......... *H04N 5/23203* (2013.01); *G02C 11/10* (2013.01); *G06F 3/013* (2013.01); *G06F 3/0485* (2013.01); *G06F 3/04817* (2013.01); *H04N 5/23216* (2013.01); *H04N 5/23296* (2013.01); *H04N 5/23299* (2018.08); *H04N 7/181* (2013.01); *H04N 9/3173* (2013.01)

(58) Field of Classification Search
CPC .......... H04N 5/23216; H04N 5/23296; H04N 5/23299; H04N 5/23203; H04N 7/181; H04N 9/3173; G06F 3/013; G06F 3/04817; G06F 3/0485; G02C 11/10
See application file for complete search history.

(56) References Cited

U.S. PATENT DOCUMENTS

| | | |
|---|---|---|
| 4,871,247 A | 10/1989 | Haynes |
| 7,431,458 B2 | 10/2008 | Jongsma |
| 7,542,210 B2 | 6/2009 | Chirieleison, Sr. |
| 7,626,562 B2 | 12/2009 | Iwasaki |
| 8,430,310 B1 | 4/2013 | Ho |
| 8,446,341 B2 | 5/2013 | Amirparviz |

(Continued)

OTHER PUBLICATIONS

International Search Report and Written Opinion for Application No. PCT/US2019/015338, dated Apr. 11, 2019, 15 pages.

(Continued)

*Primary Examiner* — Nelson D. Hernández Hernández
(74) *Attorney, Agent, or Firm* — North Weber & Baugh LLP; Michael North

(57) ABSTRACT

Presented in the present disclosure are system and methods embodiments that allow a user to wear a contact lens that provide a virtual framework for the user to retrieve information from one or more remote cameras and implement remote camera control via eye movement tracked by one or more motion sensors embedded within the contact lens. The remote camera control may include, but not limited to, pan, tilt, and zoom control. A user may activate projection of content captured from a remote camera and control the remote camera via an established communication link. The communication link may be a direct link or indirect link via one or more intermediate devices, e.g., a server and/or an accessory device. This unique way of projection activation and camera control by tracking eye movement provides a convenient and secure way for remote camera control without involvement of hands or voices.

20 Claims, 21 Drawing Sheets

(56) References Cited

U.S. PATENT DOCUMENTS

| | | | |
|---|---|---|---|
| 8,786,675 | B2 | 7/2014 | Deering |
| 9,028,068 | B2 | 5/2015 | Chang |
| 9,040,923 | B2 | 5/2015 | Sprague |
| 9,111,473 | B1 | 8/2015 | Ho |
| 9,837,052 | B2 | 12/2017 | Deering |
| 2011/0221659 | A1 | 9/2011 | King, III |
| 2014/0098226 | A1 | 4/2014 | Pletcher |
| 2014/0243971 | A1 | 8/2014 | Pugh |
| 2014/0268029 | A1 | 9/2014 | Pugh |
| 2015/0049004 | A1 | 2/2015 | Deering |
| 2015/0261294 | A1 | 9/2015 | Urbach |
| 2015/0301338 | A1 | 10/2015 | Van Heugten |
| 2015/0312560 | A1 | 10/2015 | Deering |
| 2016/0091737 | A1 | 3/2016 | Kim |
| 2016/0097940 | A1 | 4/2016 | Sako |
| 2016/0299357 | A1 | 10/2016 | Hayashi |
| 2017/0111619 | A1 | 4/2017 | Benosman |
| 2017/0116897 | A1 | 4/2017 | Ahn |
| 2017/0270636 | A1* | 9/2017 | Shtukater ............ H04N 5/2257 |
| 2018/0120568 | A1* | 5/2018 | Miller ................. G02C 7/086 |
| 2019/0025607 | A1 | 1/2019 | Liao |
| 2019/0025608 | A1 | 1/2019 | Liao |
| 2019/0098070 | A1* | 3/2019 | Kim .................... G02B 27/017 |
| 2019/0250432 | A1 | 8/2019 | Kim |

OTHER PUBLICATIONS

ITMO University. New femto-camera with quadrillion fractions of a second resolution. Eureka Alert. Jun. 21, 2017. [Retrieved Mar. 18, 2019]. Retrieved from: https://www.eurekalert.org/pub_releases/2017-06/iu-nfw062117.php> entire document (3 pages).

Lingley et al., "Asingle-pixel wireless contact lens display" J. Micromech. Microeng. 21 125014. (Year: 2011), 9 pages.

Lu, J. et al., "A 1 TOPS/W Analog Deep Machine-Learning Engine With Floating-Gate Storage in 0.13ljm CMOS," IEEE Journal of Solid-State Circuits, Jan. 2015, pp. 270-281, vol. 50, No. 1.

Ioannou, S. et al., "Proximity and Gaze Influences Facial Temperature: A Thermal Infrared Imaging Study," Frontiers in Psychology, Aug. 2014, pp. 1-12, vol. 5, Article 845.

Kim, J. et al., "3D Multi-Spectrum Sensor System with Face Recognition," Sensors, 2013, pp. 12804-12829, vol. 13.

Liu, Y. et al., "Facial Expression Recognition with Fusion Features Extracted from Salient Facial Areas," Sensors, 2017, pp. 1-18, vol. 17, No. 712.

Merla, A., "Thermal Expression of Intersubjectivity Offers New Possibilities to Human-Machine and Technologically Mediated Interactions," Frontiers in Psychology, Jul. 2014, pp. 1-6, vol. 5, Article 802.

* cited by examiner

1300

SYSTEMS AND METHODS FOR EYE-BASED EXTERNAL CAMERA SELECTION AND CONTROL

TECHNICAL FIELD

The present disclosure generally relates to systems and methods for eye-based external selection and control of a remote device, and more particularly, a contact-lens system that allows a user to select and control an external camera based on eye-movement that is tracked by sensors within a contact lens worn by the user.

BACKGROUND

Remotely controllable cameras are widely used in various applications. For example, pan-tilt-zoom cameras (also known as PTZ cameras) are an essential part of modern surveillance systems. A user may have remote pan/tilt/zoom control for a PTZ camera. In certain situations, when a user is performing certain tasks, e.g., armed patrolling, driving, searching, etc., the user may not be able to engage and control a remote camera using hands to adjust camera setting for desirable information. While a user may use voice commands for camera control, a voice input may not be a practical solution, especially when the user is in a noisy environment or needs to be silent.

Accordingly, what is needed are systems and methods that allow a user to select and control an external camera without hand or voice involvement.

DETAILED DESCRIPTION OF EMBODIMENTS

The figures and the following description relate to various embodiments by way of illustration. It is noted that from the following discussion, alternative embodiments of the structures and methods disclosed herein will be readily recognized as viable by one of skill in the art. It is further noted that any headings used herein are only for organizational purposes and shall not be used to limit the scope of the description or the claims. All documents cited are incorporated by reference herein in their entirety.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

One skilled in the art shall recognize that: (1) certain steps may optionally be performed; (2) steps may not be limited to the specific order set forth herein; (3) certain steps may be performed in different orders; and (4) certain steps may be done concurrently.

Embodiments of the present invention allow a user to wear a contact lens that provides a virtual framework for the user to retrieve information from a remote camera and implement remote camera control via eye movement tracked by one or more motion sensors embedded within the contact lens. The remote camera control may include, but not limited to, pan, tilt, and zooming control. A user may activate projection of content captured from a remote camera and control the remote camera via an established communication link. The communication link may be a direct link or indirect link via one or more intermediate devices, e.g., a server and/or an accessory device. This unique way of projection activation and camera control by tracking eye movement provides a user a convenient and secure way for remote camera control without involvement of hands or voices.

A. Eye Mounted Display System

Figure 1:
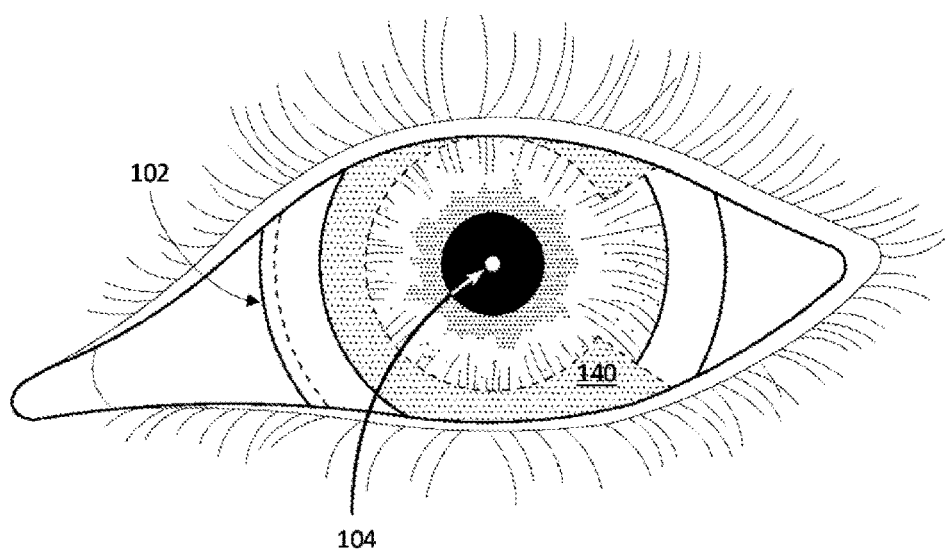
FIG. 1 illustrates an exemplary eye-mounted display ("EMD") system according to embodiments of the present disclosure.

FIG. 1 illustrates an exemplary eye-mounted display ("EMD") system according to embodiments of the present disclosure. The EMD system 102 allows a user to interact with virtual objects, including virtual tools and contents, using eye movements that are translated into a virtual scene. In one or more embodiments, the EMD system 102 may be a contact lens 140 with a display 104 in it. The contact lens may be a scleral contact lens designed to be fixed on the wearer's eyeball. Components embedded on the contact lens 140 may comprise the display 104, sensors, power components, communications devices, control systems, and other components that provide various functions within the system. The display 104 may be implemented as a miniature video projector that projects images on the part of the wearer's retina centered on the fovea; the highly sensitive and high-resolution region of the retina that is referred to when the eye directly gazes or inspects an object.

Figure 2:
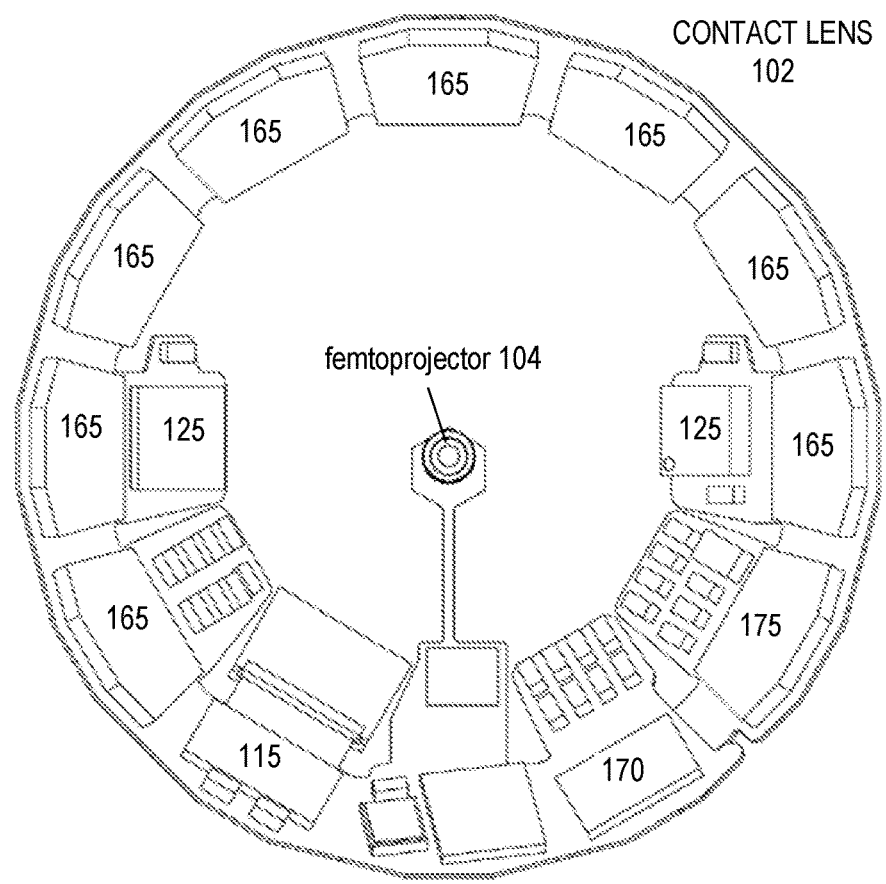
FIG. 2 illustrates an exemplary flex circuit board designed to be embedded in a contact lens according to embodiments of the present disclosure.

FIG. 2 illustrates an exemplary flex circuit board designed to be embedded in a contact lens according to embodiments of the present disclosure. In one or more embodiments, the display 104 may be defined as a femtoprojector. In embodiments, femtoprojector may be implemented as a miniature video projector that comprises an image source (e.g., a light-emitting-diode microdisplay) and an optical system that projects an image generated by the image source directly onto a user's retina to cause the image to appear in the user's field of vision. Sensors may comprise any type of motion sensors 125, such as accelerometers, magnetometers, and gyroscopes, and image sensors (such as a camera) that may be used for eye-tracking functionality. The power, communications, and control systems comprise coils that enable inductive power transfer, or an energy storage device, such as a battery 165, that can deliver sufficient energy to operate EMD system 102 for a period of time. A power circuit 170 may also be provided that regulates and controls power to the various devices on the system. Various EMD systems may also include transceivers 115 for communication with internal and/or external devices, and various controllers that control circuits and sub-circuits.

Exemplary femtoprojector, and its functions and components are described in greater detail in U.S. Pat. No. 10,353,205 B2, filed on Aug. 8, 2018, entitled "Femtoprojector optical systems," listing inventors Gregory David Miller, et al., which patent document is incorporated by reference herein in their entirety and for all purposes.

In embodiments, EMD system 102 manages how, where, and when virtual objects, such as virtual tools, peek windows and virtual windows in a virtual scene are activated, selected, displayed and dismissed within a given coordinate space. The EMD system 102 may control the content, size, and layout, etc. of a virtual scene including the graphical representation of virtual objects on the display according to user's eye-movement or gaze point within the displayed virtual scene. This control allows a user to efficiently interact with virtual objects to activate, select, update, and dismiss tools and windows in an organized and structured manner within the virtual scene.

In embodiments, eye-movements may be tracked, estimated (e.g., using a Kalman filter algorithm) and/or predicted based on motion, image, sensor data or a combination thereof. Data derived from such eye movements may include timing and sequences of saccadic movements, eye direction (e.g., eye angle, elevation, roll, and yaw), the fixation point in space, orientation of head/body, and body position data. This data may also consider wearer-specific conditions, such as physical and biological characteristics, that relate to the user's range of eye-motion, eye muscle irregularities, and other limiting factors and context that may vary over time.

The user of an eye-controlled electronic contact lens 100 may use any combination of eye movements and other signals to interact with a virtual scene within a virtual environment. This interaction may be supplemented with various auxiliary devices such a wearable head-mounted eye-tracking device, a smartphone, a hand-held controller, other body sensor, electronic jewelry or any other type of device that can communicate with the electronic contact lens.

B. Span of Eccentricity

Figure 3:
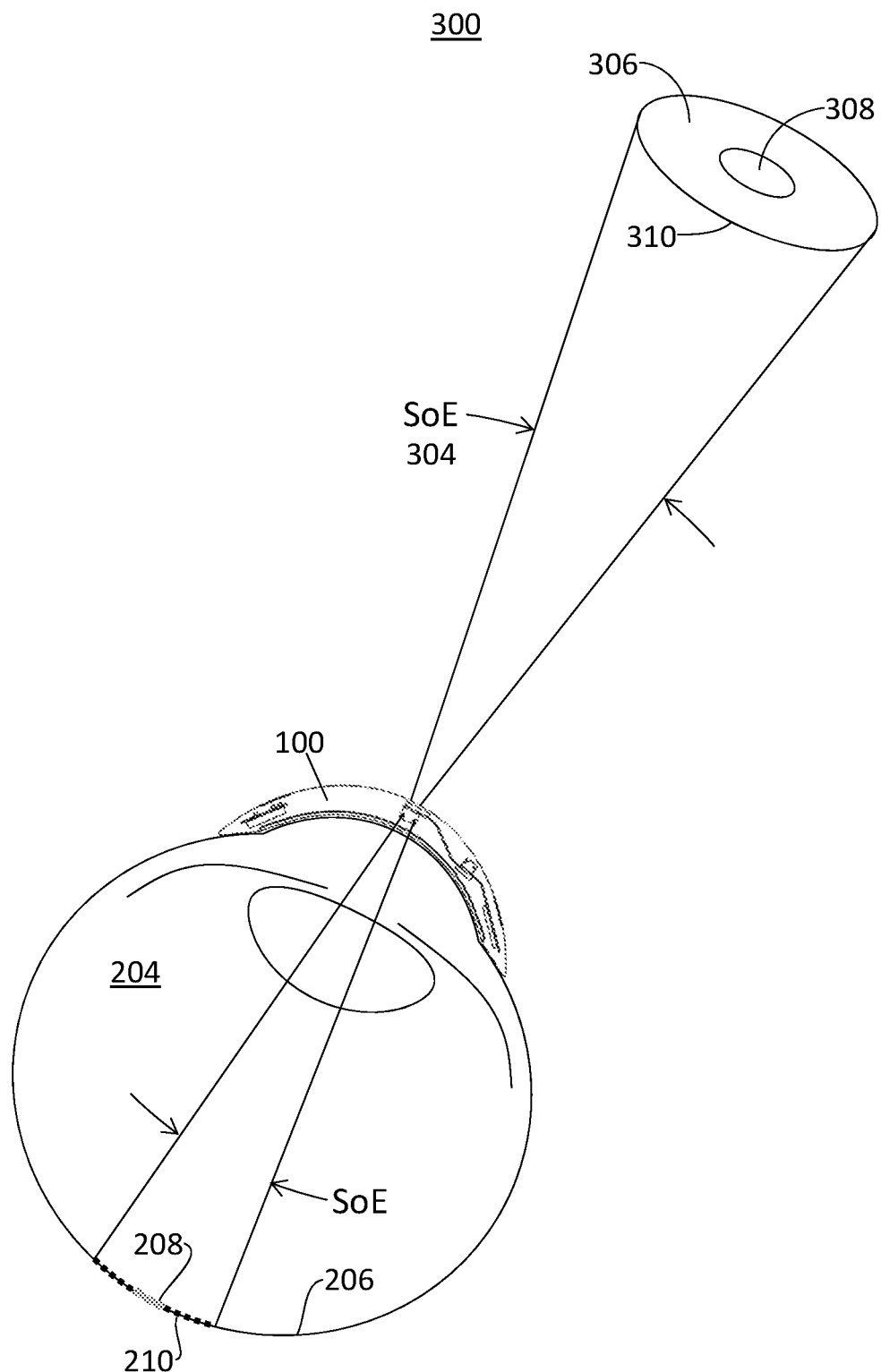
FIG. 3 illustrates Span of Eccentricity (SoE) according to embodiments of the present disclosure.

FIG. 3 illustrates the concept of Span of Eccentricity (hereinafter, "SoE") according to embodiments of the present disclosure. In this document, the term "projected" is used interchangeably with the terms "displayed." Similarly, the term "user" is used interchangeably with the term "wearer." "Activating" refers to exiting a standby (sleep) modes or switching to a wake mode; triggering; or selecting, enabling, displaying, or otherwise making available a virtual tool, event, or area. "Span of Eccentricity" refers to the angular width of the image 210 centered on the line of gaze, extending into the peripheral vision. As depicted in FIG. 3, the projected image 210 is the visible section 310 of a virtual scene. In embodiments, looking outward from eye 204, the image 210 that is projected onto retina 206 by electronic contact lens 100 appears to have an angular width in the outside world equal to that of the SoE 304.

In embodiments, because electronic contact lens 100 is fixed on eyeball 204, the image 210 projected by electronic contact lens 100 is ordinarily fixed (i.e., locked) to and moves together with eyeball 204. As a result, the wearer sees projected image 210 displayed on retina 206 irrespective of where wearer of electronic contact lens 100 directs the wearer's eye 204 (or any other body parts). In fact, the wearer of electronic contact lens 100 cannot even look at or fixate eye 204 anywhere other than about the center of SoE 304; specifically, the foveal vision region 308 (the fovea extends from zero to about 1.5° eccentricity about 3° within the SoE). Thus, irrespective of where eye 204 moves, the wearer cannot look at or inspect objects or images appearing outside of foveal vision region 308 at the edges of SoE 304 as those images remain only in the wearer's peripheral vision region 306. Stated differently, while the wearer of electronic contact lens 100 may recognize that a virtual object is present at the edge of projected image 210, without additional capability, the wearer is unable to direct the wearer's gaze there. Because eye movements alone do not change the content and location of what is projected on the wearer's retina 206, the attempt to gaze at an object displayed in peripheral vision region 306 is rendered futile.

A person of skill in the art will appreciate that the concept of SoE is markedly different from, and not to be confused with, the concept of "field of view" as used in connection with conventional displays, such as computer monitors, TVs, or displays on eyeglasses (i.e., the angular separation between the edges of a display). For instance, if a user has to move eyes by an angle of 50 degrees from one edge of a conventional display to the opposite edge, the field of view is said to be 50 degrees wide.

In contrast to a traditional display, a canvas that has a fixed width and height that define the user's field of view, here, the entire world around the user's head/eyes is the virtual canvas. This is true even if the image displayed on retina 206 is a portion of the canvas that is covered by SoE 304, i.e., what is seen at any moment in time when eye 204 does not move. The extent of the virtual canvas is practically unlimited in that moving SoE 304 (i.e., the visible portion) allows the user to view a virtual scene in all directions (i.e., 360 degrees around the user) with no boundaries and without a "field of view" limitation. In an augmented reality (AR) system, the visible area is the same as the field of view of the display area. Despite the limited field of view, a user can look around a larger virtual scene in an AR system by turning the head.

As discussed in greater detail below, to enable direct inspection of objects in a virtual scene with highly sensitive fovea 208 that are located outside of foveal region 308 or outside SoE 304, the projected image 210 is updated to move SoE 304 to a new location within the virtual scene. The updated image is correlated to the movement of the eye 204 and electronic contact lens 100 to render appropriate virtual content to the user. For example, if a movement of eye 204 in one direction occurs, the projected image 210 may be updated in an opposite direction such as to allow the user to scan the virtual scene.

Overall, unlike for conventional displays, such as monitors, phone screens, AR glasses/goggles, or other types of displays in the pertinent art, the wearer of a contact lens comprising electronic contact lens 100 does not perceive images generated by the image projector and displayed within SoE 304 as being in a "field of view."

It is understood that one or more femtoprojectors may be used, for example, one femtoprojector that projects an image directly onto fovea 208, which contains the highest number of retinal receptive fields, i.e., generating the highest resolution images on retina 206. And a different, lower resolution femtoprojector may be used to project images mainly onto the "lower-resolution" peripheral region of retina 206 that cannot resolve the higher resolution images.

It is noted that electronic contact lens 100 may be used in VR applications, AR applications, mixed reality (MR) applications, and the like. In virtual reality applications, the image projected by electronic contact lens 100 replaces what the user would normally see in the external environment, whereas in AR and mixed reality applications, the projected images appear superimposed onto the external environment, such that the projected image augments or adds to what the user sees in the real world.

It is noted that embodiments presented herein may equally be used non-EMD systems, such as AR, VR, MR, and extended reality (XR) displays, in related applications to enable a clutter-free, naturally flowing, and user-friendly navigation. One skilled in the art will recognize the difficulty in allowing a user to interact with virtual content available within the virtual environment displayed on the user's retina. The discussion below identifies different embodiments that allow a user to activate projection and implement remote camera control based on tracked eye movements and/or simple physical interaction with an auxiliary device.

C. Embodiments of Eye-Based Activation and Camera Control

Figure 4A:
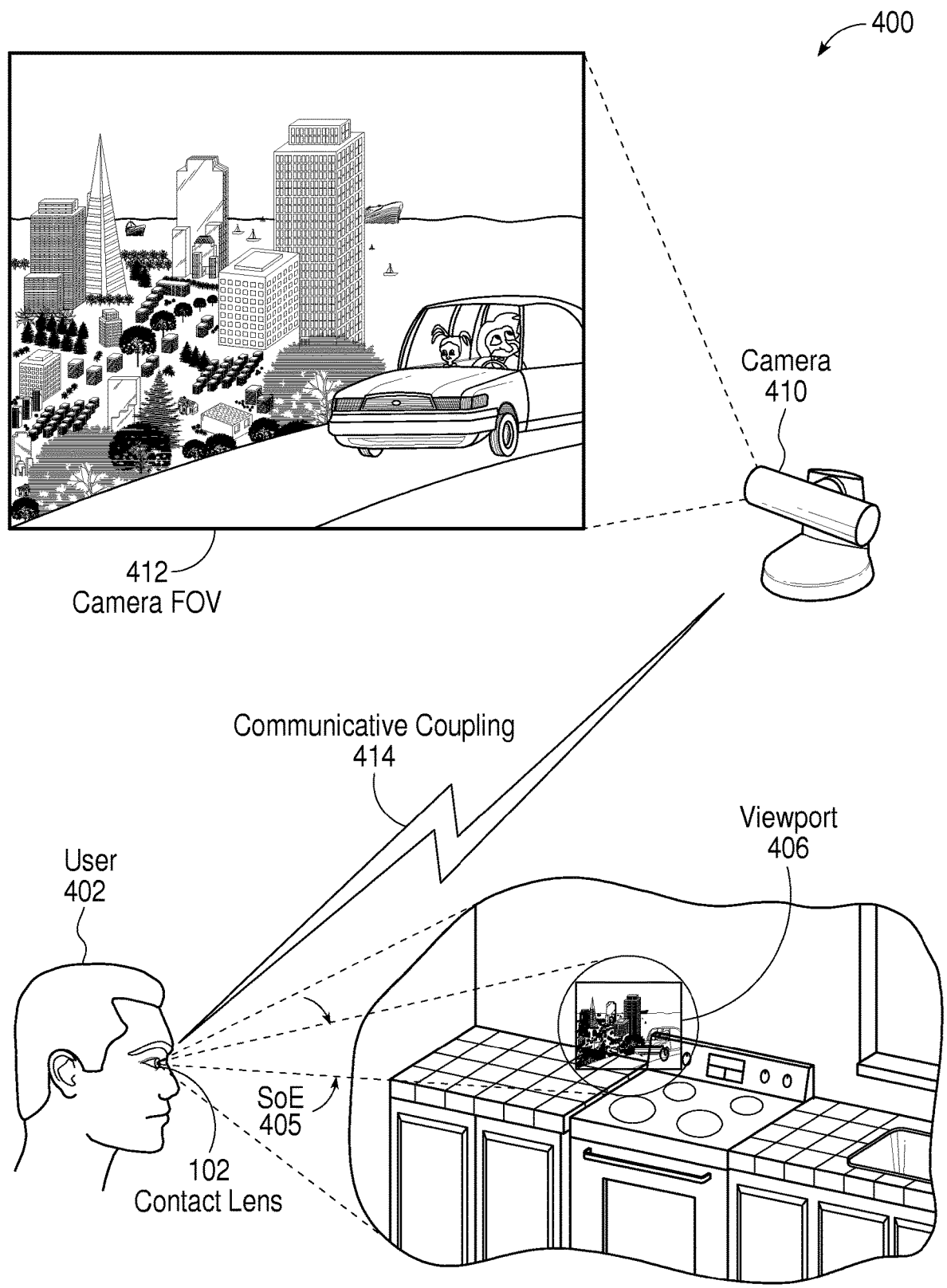
FIG. 4A illustrates a user interacting with an eye-controlled remote camera with projected virtual content superimposed on a field of view of the user according to embodiments of the present disclosure.

FIG. 4A illustrates a user interacting with an eye-controlled remote camera with projected virtual content superimposed on a field of view (FOV) of the user. The one or more virtual contents, within the SoE 405, comprise at least part of a viewport 406, which functions as an interface to render a virtual scene corresponding to the FOV 412 of a remote camera 410. The viewport 406 may be fully within the SoE, and thus the virtual scene is fully visible to the user, as shown in FIG. 4A. In one or more embodiments, the viewport 410 may be partially within the SoE, and thus the virtual scene extends beyond the SoE and is partially visible to the user. In one or more embodiments, the viewport 410 may be larger (i.e. have a greater angular extent) than the SoE, and be partially visible to the user.

The virtual scene rendered in the viewport 406 may have one or more different specifications, e.g., size, aspect ratio, resolution, frame rate, etc., from imagery captured by the remote camera 410. The remote camera 410 communicatively couples to a contact lens 102 via a communicative coupling link 414, which may be a direct end-to-end link or a link though one or more intermediate devices. Upon activation, imaging data corresponding to imagery captured by the remote camera are transmitted to the contact lens to construct the virtual scene. and projected from the contact lens onto a retina of a user 402 of the contact lens. As a result, the user sees the projected viewport 406 located in the user's view.

In one or more embodiments, the camera 410 may be a camera, e.g., a PTZ camera, capable of at least one of remote direction control and zoom control. The camera 410 transmits imaging data to the contact lens 102 directly or indirectly, receives a control signal from the contact lens 102, updates one or more settings, e.g., pan, tilt, zoom, etc., based on the received control signal, and transmits contents of updated imaging data corresponding to updated imagery captured using the one or more updated settings.

Figure 4B:
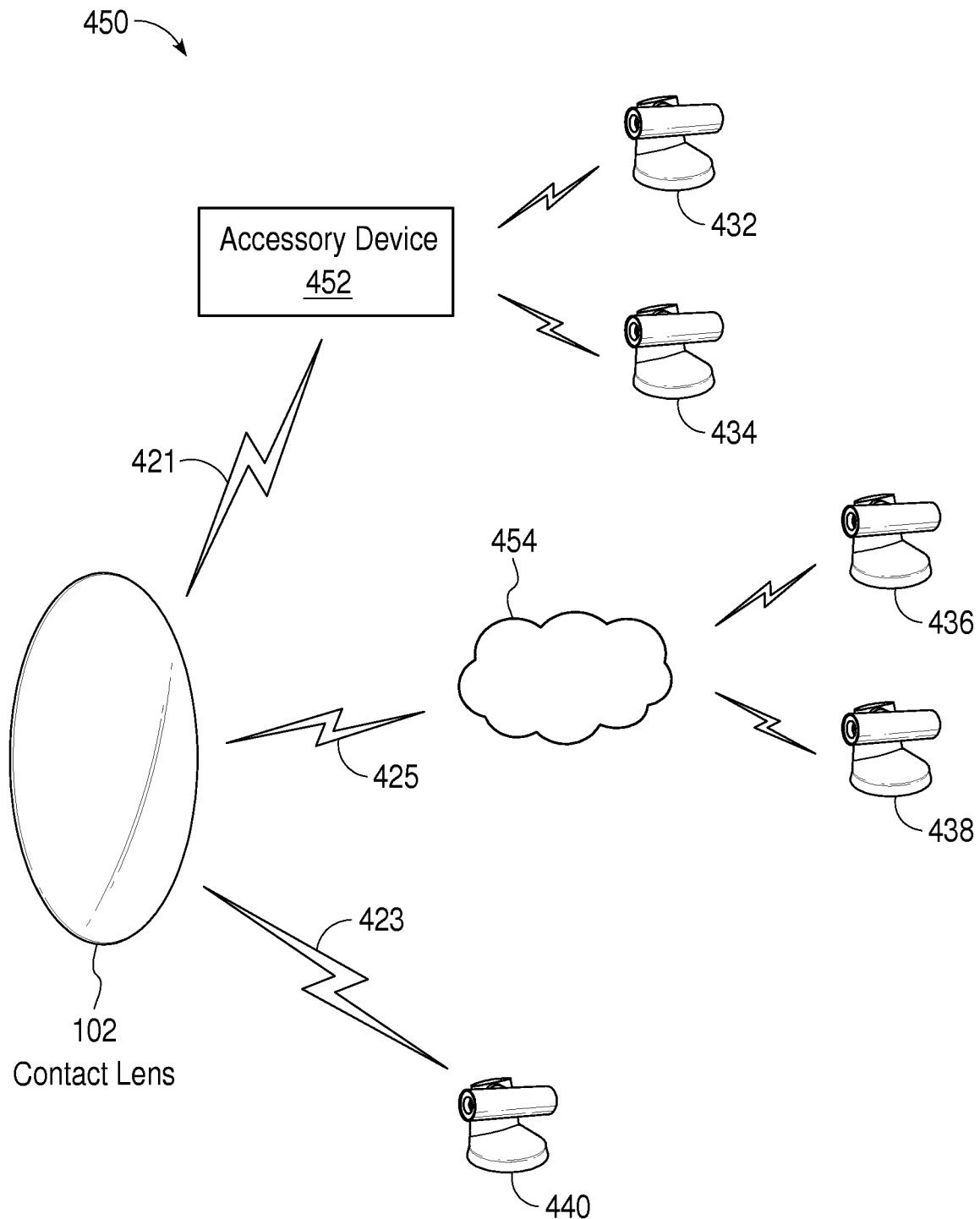
FIG. 4B illustrates various communicative coupling links between the contact lens and remote cameras according to embodiments of the present disclosure.

FIG. 4B illustrates various communicative coupling links between the contact lens and remote cameras according to embodiments of the present disclosure. As shown in FIG. 4B, a communicative coupling link between the contact lens 102 and a remote camera may be a direct link, e.g., a link 423 to a camera 440, or a link though one or more intermediate devices, e.g., a sever 454 or an accessory device 452. In one or more embodiments, the contact lens 102 may transmit a communication request to the sever 454 (e.g., a cloud server) via a communication link 425 between the contact lens and the server. The communication request may indicate a desired camera (e.g., a camera 436), among a plurality of cameras (e.g., camera 436, 438, etc.), that a user would like to view or control. In one or more embodiments, the server 454 and the plurality of cameras (e.g., camera 436, 438, etc.) may be part of a network 435, which may be a security network, a surveillance network, etc.

After receiving the request (and optionally upon verification), the server transmits imaging data corresponding to imagery captured by the desired camera (e.g., the camera 436) to the contact lens via the communication link 425. The imaging data transmitted by the server 454 to the contact lens 102 may or may not be the same as imaging data that the server receives from the camera 436. In one or more embodiments, the server may apply one or more adjustments of the images received from the camera 436. The adjustment may be related to one or more of image size, pixel density, e.g., pixels per inch (PPI), image refresh rate (when sequences of images are transmitted in a stream), etc. For example, the server may receive images in a high definition (HD) format. However, the communication link between the server and the contact lens may have limited bandwidth to support HD streaming in real-time, or the contact lens may not have adequate hardware/software capacity to support HD streaming at the same frame date as the camera. In one or more embodiments, the server may have adequate image processing hardware/software capacity to compress the images or stream received from the camera 436 and transmit a processed format, e.g., lossy or lossless, to the contact lens, such that there is no perceivable latency delay (e.g., <100 ms) for the user. Upon the contact lens transmitting an updated communication request to access another camera (e.g., the camera 438), the server may stop transmitting contents related to images captured from the camera 436 and start transmitting contents from the camera 438. Depending on camera specification, the server may apply same, similar or different compression algorithm to images captured by the camera 438.

Similar to the embodiments with a server as an intermediate device, communication between the contact lens 102 and remote camera(s) 432, 434 may be implemented via an accessory device 452, which may be an electronic device that the user carries and places in proximity to the contact lens. For example, the accessory device may be a smartphone, a smart watch, an electronic necklace, etc. The accessory device 452 communicatively couples to the contact lens and selectively communicates to one of a plurality of cameras, e.g., camera 432 and 434. The accessory device 452 may perform similar implementations to the server 454 as a bridge between an engaged remote camera and the contact lens.

Although FIG. 4B lists examples including a direct communication link, a communication link via a server, a communication link via an accessory device, one skilled in the art may understand that other or additional intermediate devices may be involved as a bridge or part of a bridge between the contact lens and an engaged camera. Such variation shall still fall within the true spirit and scope of the present disclosure.

Figure 5:
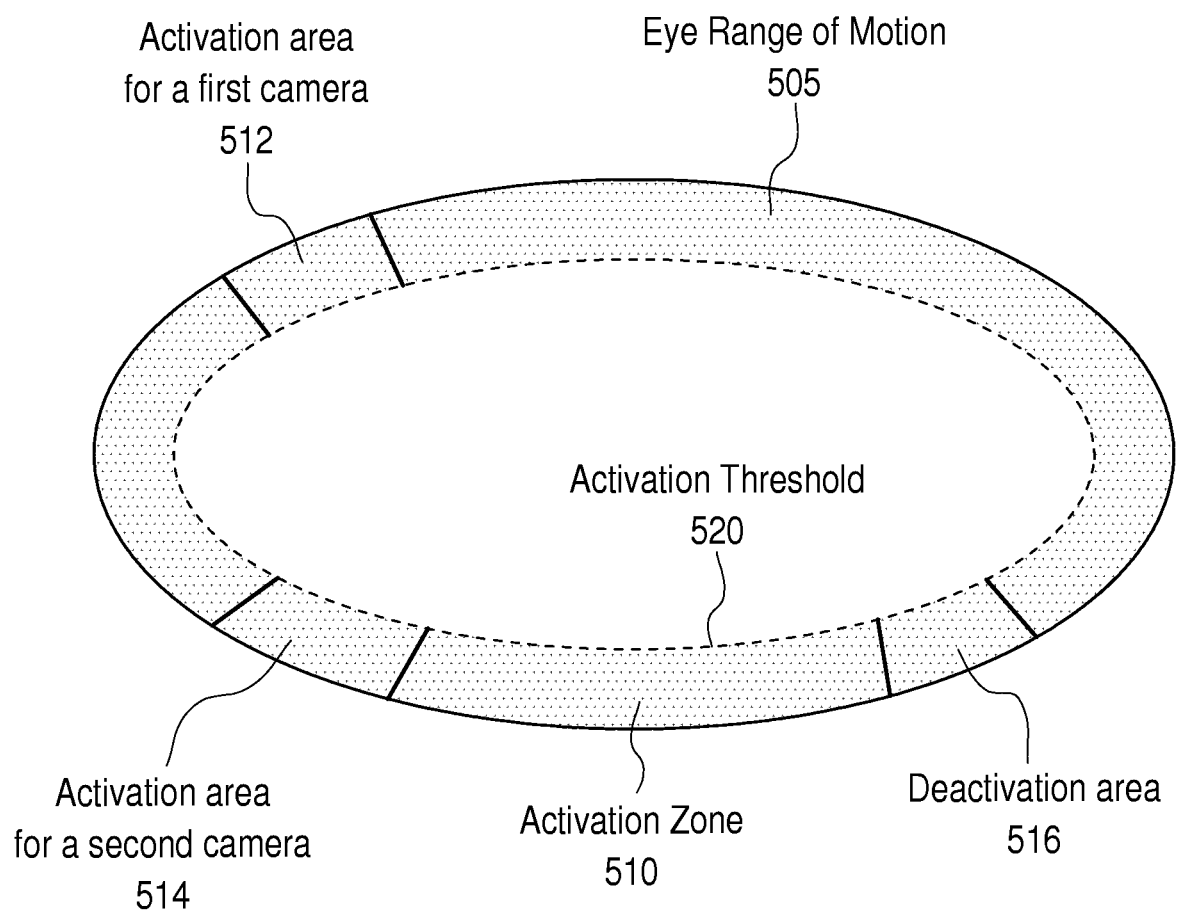
FIG. 5 illustrates exemplary activation threshold and activation zones for projection contents captured by remote cameras according to embodiments of the present disclosure.

FIG. 5 illustrates activation threshold and activation zones for projection contents captured by remote cameras according to embodiments of the present disclosure. FIG. 5 depicts a schematic range of motion 505 of human eyes, not accounting for variations between individuals. Ranges of motion 505 for the human eye are typically greater than 95° horizontally and 75° vertically. Yet, most of the time, the eye operates in the central region of range 502 rather than at the periphery of range 505. Therefore, in embodiments, eye motion towards or directed at the periphery of range 505 may be advantageously used to indicate an activation request for viewport projection. In certain examples, once one or more motion sensors within the contact lens indicate that the user's eye motion or gaze is across an activation threshold 520 to enter an activation zone 510, the contact lens may activate the projector to one or more project virtual contents comprising at least part of a viewport (not shown in FIG. 5) rendering a virtual scene onto the retina of the user. The virtual scene rendered in the viewport corresponds to imagery captured by a camera communicatively coupled to the contact lens. The activation zone 510 is a subset of the entire range of motion 505 of the eye. As an example shown in FIG. 5, the activation zone 510 is a zone between a boundary of the range of eye motion 505 and the activation threshold 520. In one or more embodiments, the activation threshold 520 may be defined as a predetermined upper boundary of eye motion (e.g., 90° horizontally and 70° vertically) beyond a user's "normal" range of eye motion such that the projector will not be accidently triggered.

In one or more embodiments, the activation zone 510 may comprise multiple activation areas with each activation area associated with a specific remote camera. For example, as shown in FIG. 5, a first activation area 512 is located a top left corner in the activation zone 510 to specifically associate with a first remote camera (e.g., the camera 436); a second activation area 514 is located in a bottom left corner in the activation zone 510 to specifically associate with a second remote camera (e.g., the camera 438), etc. When the use's gaze falls within an activation area (e.g., 512 or 514), a corresponding viewport is projected to display a virtual scene corresponding to imagery from an associated remote camera. The user may selectively engage a desired remote camera for content projection by gazing at a corresponding activation zone corresponding to the desired remote camera. The association of different activation zones to different remote camera may be predetermined by control logic stored within a memory or cache within the contact lens. In one or more embodiments, to further ensure that a viewport will not be unintentionally triggered, a gaze time may be incorporated in combination with a gaze point as a prerequisite for activation. For example, a user may need to gaze the first activation area 512 for a time longer than a threshold, e.g., 0.2$s$, to engage the first remote camera for content projection. Such a threshold may be the same for all activation areas and the deactivation area 516.

In one or more embodiments, the activation zone 510 may comprise a deactivation area 516, which is located differently from activation areas. In the example shown in FIG. 5, the deactivation area 516 locates in a bottom right of the activation zone 510. Once the projector within the contact lens is activated with a viewport projected, the user may deactivate the projector by gazing within the deactivation area 516.

Figure 6:
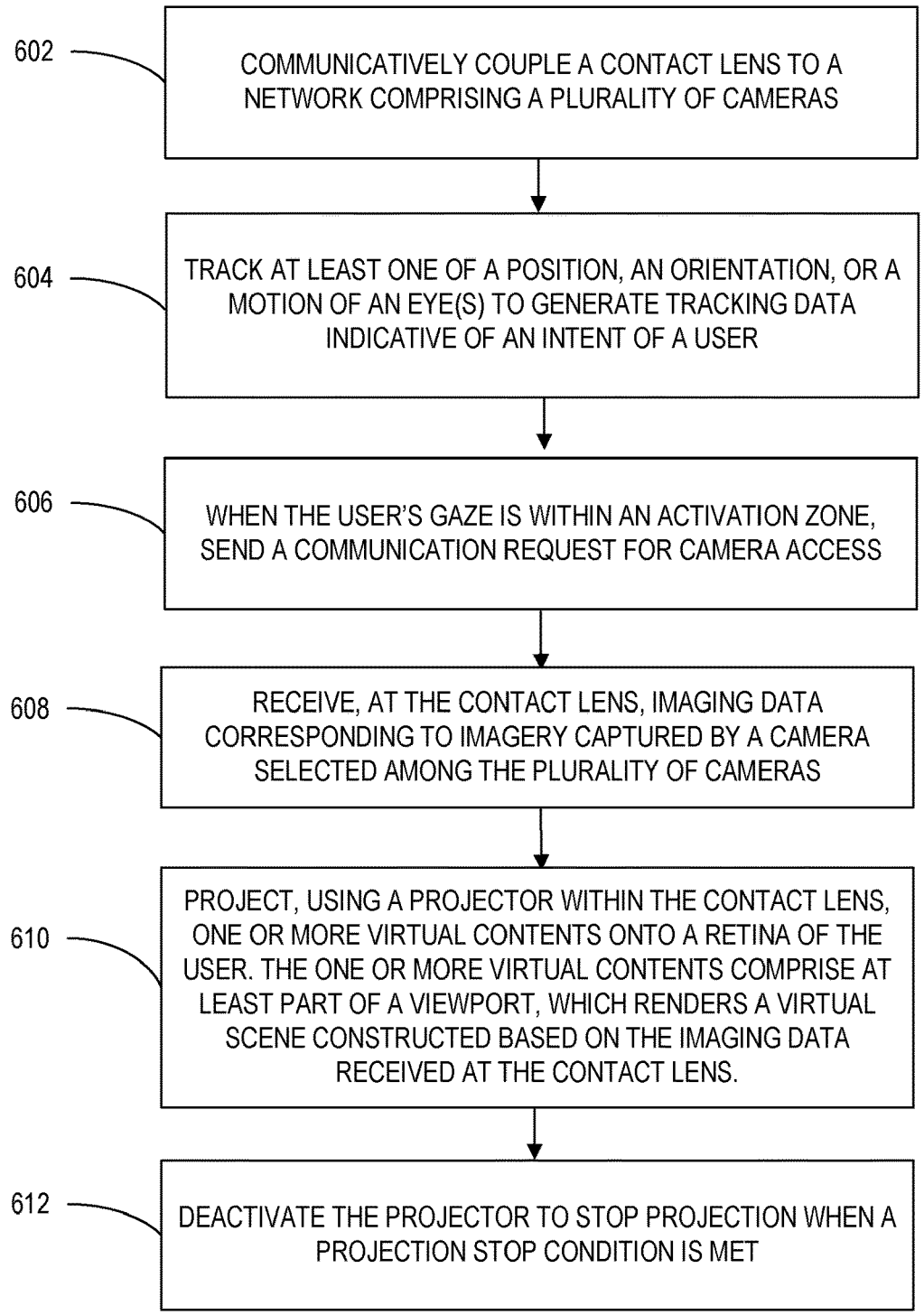
FIG. 6 illustrates a process for remote camera selection and virtual scene projection according to embodiments of the present disclosure.

FIG. 6 illustrates a process for remote camera selection and virtual scene projection according to embodiments of the present disclosure. In step 602, a contact lens communicatively couples to a network comprising a plurality of cameras. In step 604, at least one of an eye position, an eye orientation, or an eye motion are tracked, using one or more sensors integrated within the contact lens, to generate tracking data indicating an intent of the user.

In step 606, when the user's gaze is within an activation zone, sending a communication request for camera access. In one or more embodiments, the activation zone comprises multiple activation areas, as shown in FIG. 5, with each area associated with a corresponding camera. Depending on a location of the user's gaze within the activation zone, the communication request may be a request to obtain information for a specific camera among the plurality of cameras.

In step 608, the contact lens receives imaging data corresponding to imagery captured by a camera (e.g., camera 436), which may be selected among the plurality of cameras based on the communication request.

In step 610, a projector within the contact lens projects one or more virtual contents onto a retina of the user. The one or more virtual contents comprise at least part of a viewport, which renders a virtual scene constructed based on the imaging data received at the contact lens. In one or more embodiments, the one or more virtual contents may also comprise additional information, e.g., camera identification for user awareness, a gaze indicator showing a gaze point of the user, etc. The viewport may further render one or more camera settings associated with the virtual scene. If a user desires to access a second camera (e.g., camera 438), the user may move a gaze point into another activation area (e.g., activation area 514) corresponding to the second camera, a second viewport, replacing the current viewport, may be projected directly to render at least part of a virtual scene related to imagery captured by the second camera. The second viewport may have one or more different parameters from the replaced viewport. For example, the second viewport may have an aspect ratio of 16:9 (to match the camera 438), while the replaced viewport has an aspect ratio of 4:3 (to match the camera 436). In step 612, the projector is deactivated to stop projection when a projection stop condition is met. For example, the projection stop condition may be a condition that the gaze point is in a deactivation area (e.g., deactivation area 514). In another example, the projection stop condition may be a condition that the remote camera powers off or stop operation. In yet another example, the projection stop condition may be a condition that a user is looking away from the viewport, or a user may press a button on an accessory device, coupled to the contact lens, to indicate user intent to stop viewport projection.

Figure 7:
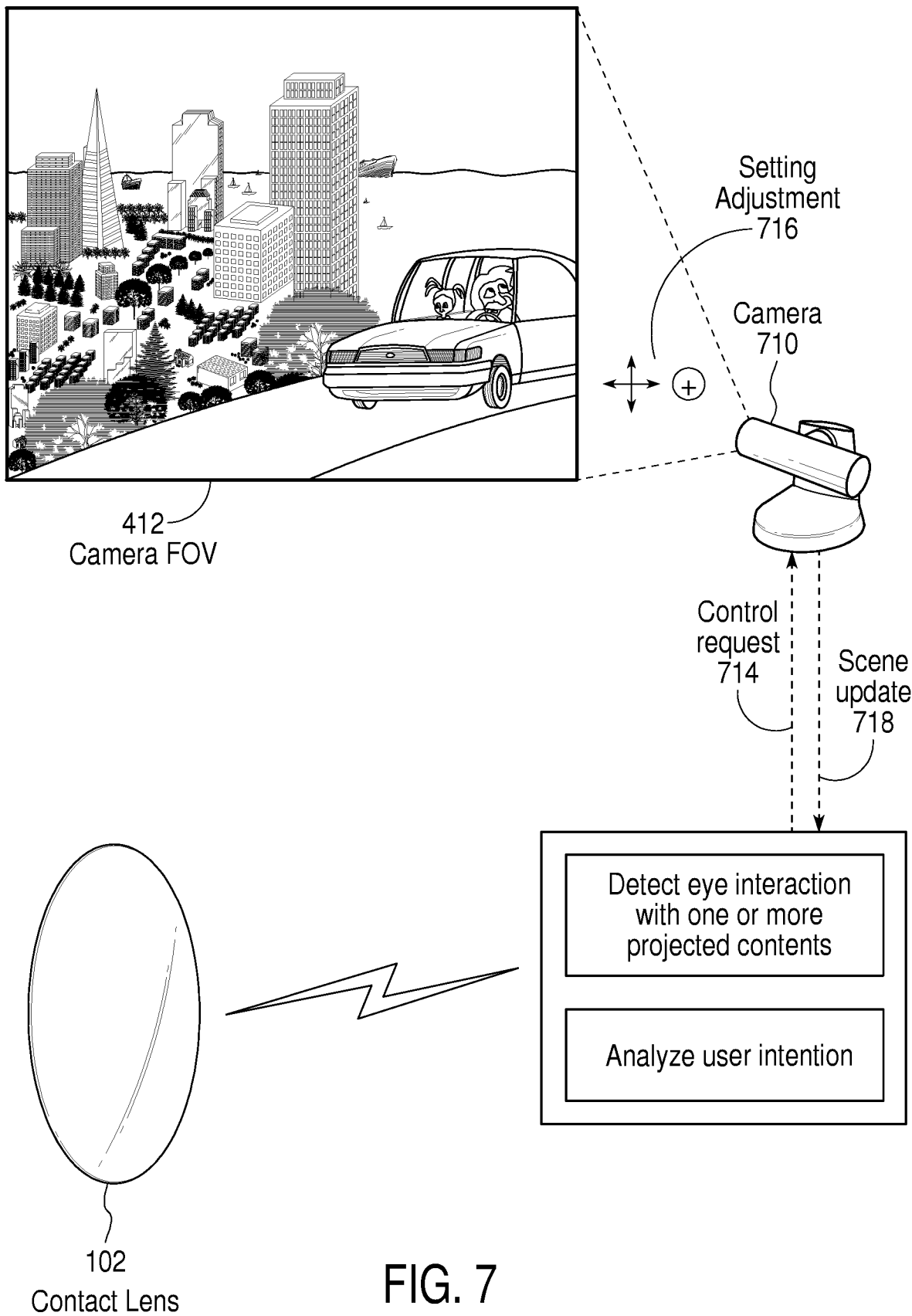
FIG. 7 illustrates a contact lens coupling to a camera for implementing remote control according to embodiments of the present disclosure.

The contact lens may also be used for remote camera control, in addition to projection activation of virtual scene corresponding to imagery captured by a remote camera. FIG. 7 illustrates a contact lens coupling to a camera for implementing remote control according to embodiments of the present disclosure. Once a viewport or part of the viewport is projected onto the user's retina and thus visible for the user, the user may have interaction with the viewport via one or more eye reactions, e.g., eye movements, gaze points and time, etc., which are tracked by one or more motion sensors integrated within the contact lens. The user's interaction may be analyzed to obtain a user intention, which may be a desire to change or update the virtual scene in the projected viewport. Such a change may involve one or more setting adjustments of the remote camera (e.g., camera 410). Accordingly, the contact lens may transmit a control request 714 indicating the intention of the user. The camera receives the control request and implements one or more setting adjustments 716 to update captured images.

Upon activation, the contact lens 102 establishes a communicative coupling link to the camera 410. As described earlier with respect to FIG. 4A-4B, the communicative coupling link may be a direct communicative link or indirect communicative link via one or more intermediate devices. At least part of a viewport, which displays a virtual scene corresponding to imagery or FOV 412 from the camera 410, is projected onto a retina of the user and visible for the user. The viewport also functions as a user interface for user interaction. The contact lens integrates one or more motion sensors to detect eye interaction with the viewport or visible part of the viewport. The detected eye interaction may be analyzed for user intention, e.g., shifting the virtual scene, enlarging the virtual scene, tracking a moving object, etc.

In one or more embodiments, eye interaction may comprise one or more of: a location of a gaze point within the viewport, a gaze time, etc. The viewport may comprise one or more predetermined areas to initiate a control request for camera setting adjustment when a user's gaze falls into a predetermined area. The contact lens sends a control request 714 to the camera 410, which implements one or more setting adjustments 716 based on the control request for imagery capturing. In one or more embodiments, the setting adjustment may comprise one or more settings of pan, tilt, zoom, etc. Updated imaging data 718 for images captured using the one or more adjusted settings are transmitted back to the contact lens for viewport updating.

Figure 8A:
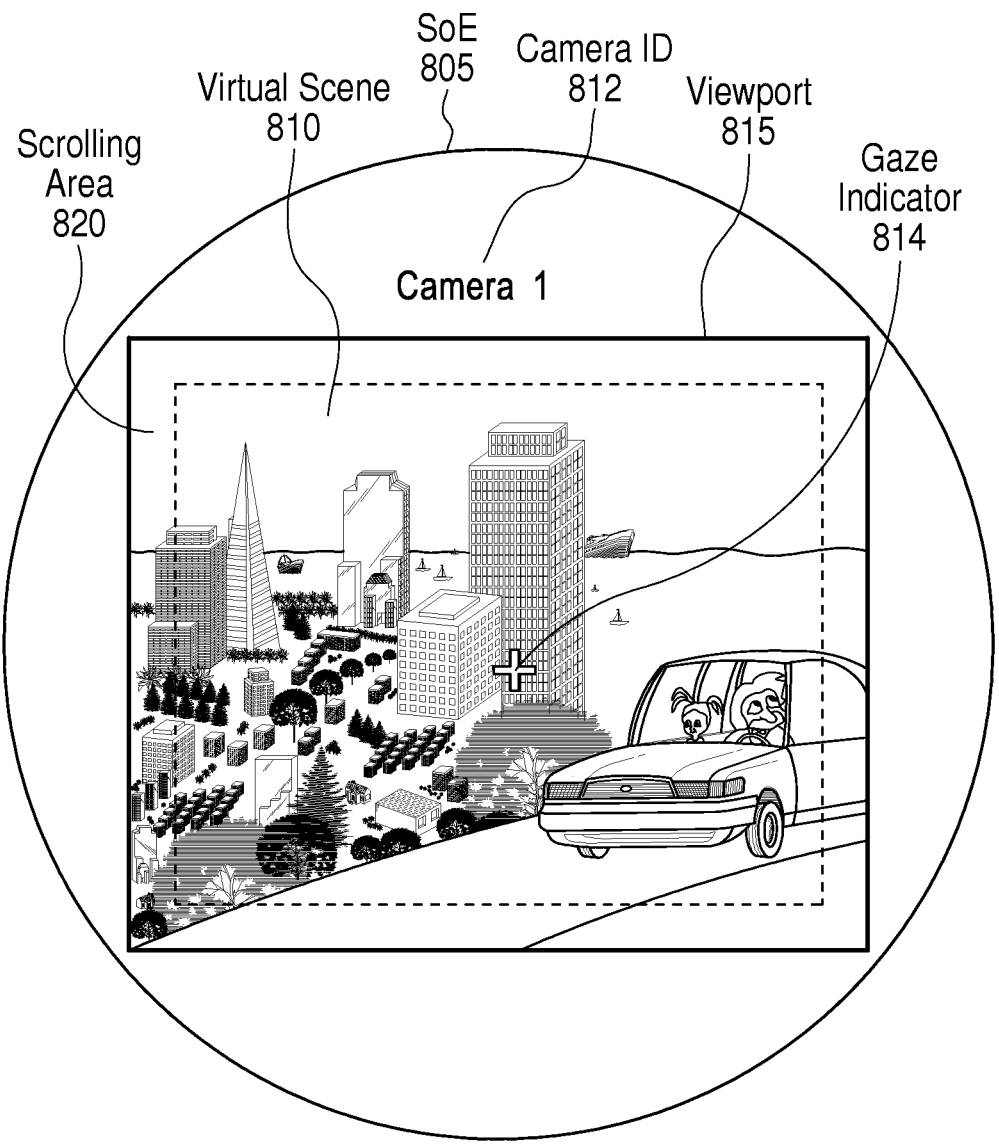
FIG. 8A illustrates an exemplary viewport fully visible to the user according to embodiments of the present disclosure.

FIG. 8A illustrates an exemplary viewport fully visible to the user according to embodiments of the present disclosure. As shown in FIG. 8A, the viewport 815 is fully within the SoE 805 and displays a virtual scene 810, which is related to the imagery 412 captured by the camera 410. The virtual scene 810 may have one or more different specifications, e.g., size, resolution, frame rate, etc. from the imagery 412. The contact lens may also project one or more virtual contents, in addition to the viewport, for user view. The projected one or more virtual contents may comprise camera identification 812 for user awareness, a gaze indicator 814 showing a gaze point of the user. Although the gaze indicator 814 is shown as a cross symbol in one or more embodiments, the contact lens may project a viewport with a gaze indicator of other crosshair shapes, or even without a gaze indicator and embodiments of remote camera control may still be implemented. In one or more embodiments, the viewport may further comprise a scrolling area 820, which may be a predetermined area along the edge of the viewport 815. As shown in the exemplary embodiment in FIG. 8A, the scrolling area 820 is a band with a predetermined width along the edge of the viewport 815. When eye tracking data, generated by one or more sensors disposed within a contact lens, identify that a gaze point of the user is within the scrolling area, it indicates a user intention to pan or tilt the camera such that virtual scene 810 may be scrolled in a desired direction depending on location of the gaze indicator in the scrolling area 820. In one or more embodiments, the term "scroll," "scrolling," or "scrolled" is referred as related to shifting of the virtual scene, as a result of panning/tilting of the camera, relative to the viewport. A user may need to gaze at the scrolling area 820 for a time longer than a scrolling time threshold, e.g., 0.1 second, as an indication that the user intents to pan or tilt the camera. Although the viewport 815 in FIG. 8A is fully within the SOE 805, one skilled in the art shall understand that the viewport may be larger (i.e. have a greater angular extent) than the SoE, and be partially visible to the user.

In one or more embodiments, the desired direction of camera scrolling is in line with the location of the gaze indicator in the scrolling area 820. For example, when the gaze indicator is on a left side in the scrolling area 820, it indicates that the user desired the camera to be directed leftward. Such a buttonless camera scrolling request provides a straightforward and intuitive way to implement remote scrolling control.

The user may also implement eye-based remote zoom control. As shown in FIG. 8A, when the gaze indicator remains on a location within a predetermined range, e.g., a 2° circle, (e.g., the location as part of a building in FIG. 8A) in the virtual scene (other than the scrolling area) for a time longer than a predetermined zooming time threshold, it indicates that the user desires the camera to zoom in further for a more detailed view (and preferably centered on the gaze point). The contact lens may send a control request, which is a zoom request indicating a zooming intention, and optionally the gaze point, to a remote camera. The remote camera receives the control request and implements one or more setting adjustments to update captured images. Setting adjustments may comprise increasing a zoom setting, and optionally changing a pan or tilt setting such that the gaze point may be centered the images captured using with the one or more adjusted settings.

The predetermined zooming threshold for zooming intention may be a time interval close to zero or even as zero, such that the control request for zooming may be transmitted immediately, or almost immediately, to minimize a latency in the whole virtual scene updating process for improved user experience.

Figure 8B:
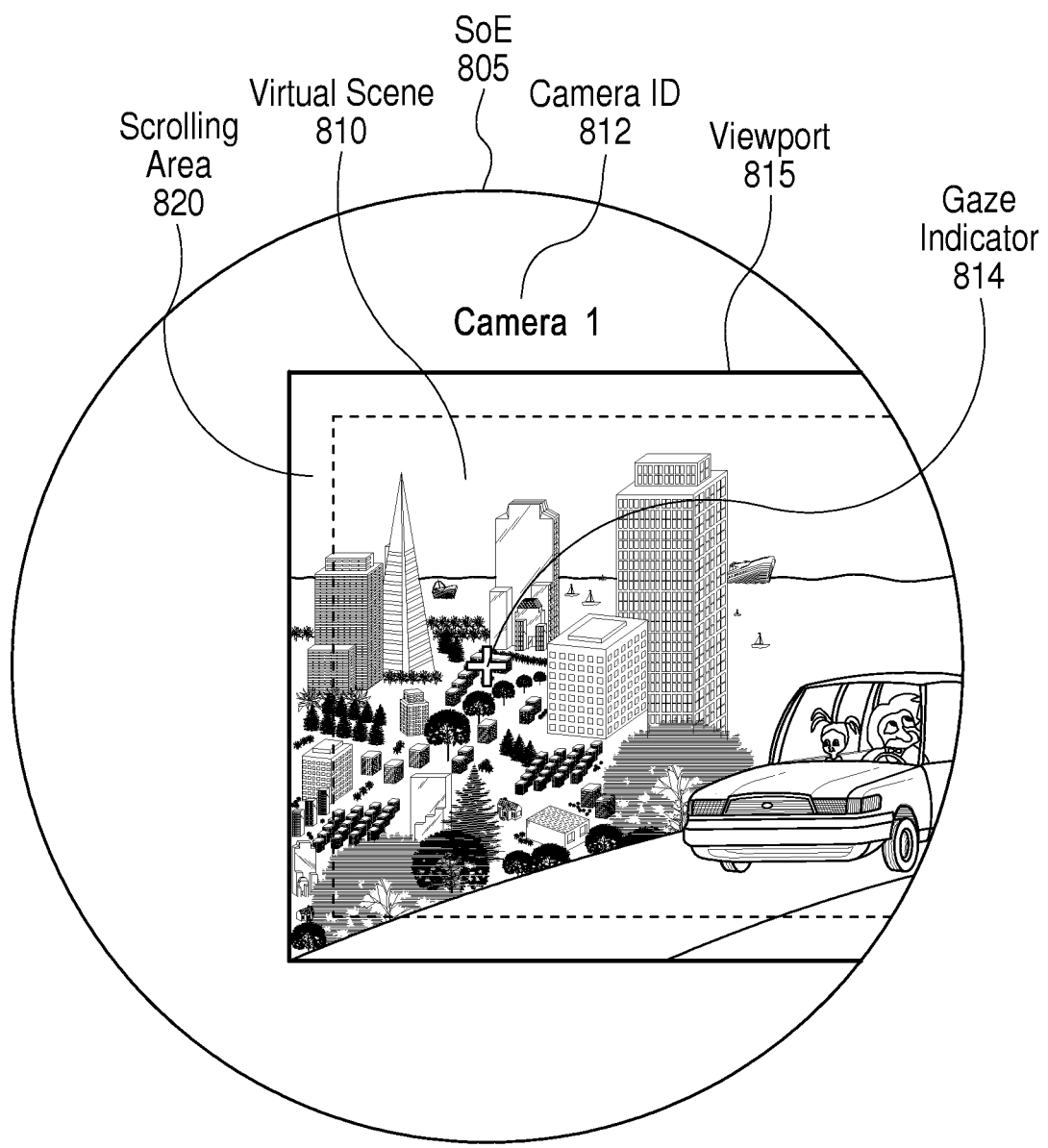
FIG. 8B illustrates an exemplary viewport partially visible to the user according to embodiments of the present disclosure.

In one or more embodiments, a viewport may extend beyond the SoE and therefore may not be fully within the SoE. Accordingly, only part of the viewport is visible to a user. FIG. 8B illustrates an exemplary viewport partially visible to the user according to embodiments of the present disclosure. As shown in FIG. 8B, the viewport 815 extends beyond the SoE 805 and is only partially visible to the user. If the user desires to view virtual scene outside of the SoE (as referred as invisible virtual scene), the user may need to move the gaze toward the invisible virtual scene, such that the invisible virtual scene may appear within the SoE for user review. For example, if the user desires to view the right end of the virtual scene, the user just move the user's gaze toward to the right end such that right end of the viewport may appear within the SoE and thus be visible to the user.

Figure 9:
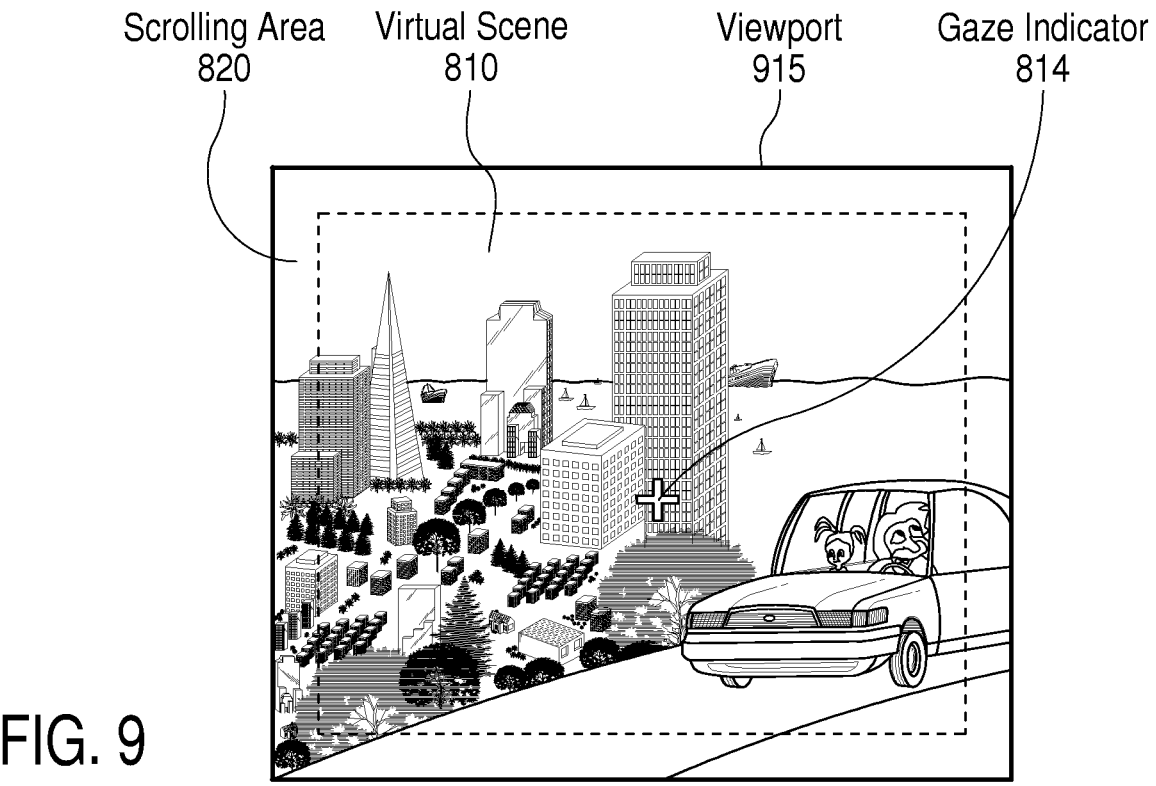
FIG. 9 illustrates an exemplary viewport with zoom control according to embodiments of the present disclosure.

FIG. 9 illustrates an exemplary viewport 915 with zoom control according to embodiments of the present disclosure. When the gaze indicator 814 remains on a location within a predetermined range (e.g., the location as part of a building in FIG. 9) in the virtual scene 810 for a time longer than a predetermined zooming time threshold, it indicates that the user desires the camera to zoom in further for a more detailed view (and preferably centered on the gaze point) within the viewport.

In one or more embodiments, when the remote camera reaches its highest zoom level, a message may be included, by the camera or by a server, in the imaging data transmitted to the contact lens as a notice that a maximum zoom level has been reached. Upon receiving the message, the contact lens may project a first visual notice in the viewport to notice the user. For example, the first visual notice may be a flashing entire edge of the viewport such that the user may realize that the virtual scene may not be further zoomed. The flashing may be last temporality, e.g., 0.5 s, in a first predetermined color, e.g., red.

Figure 10:
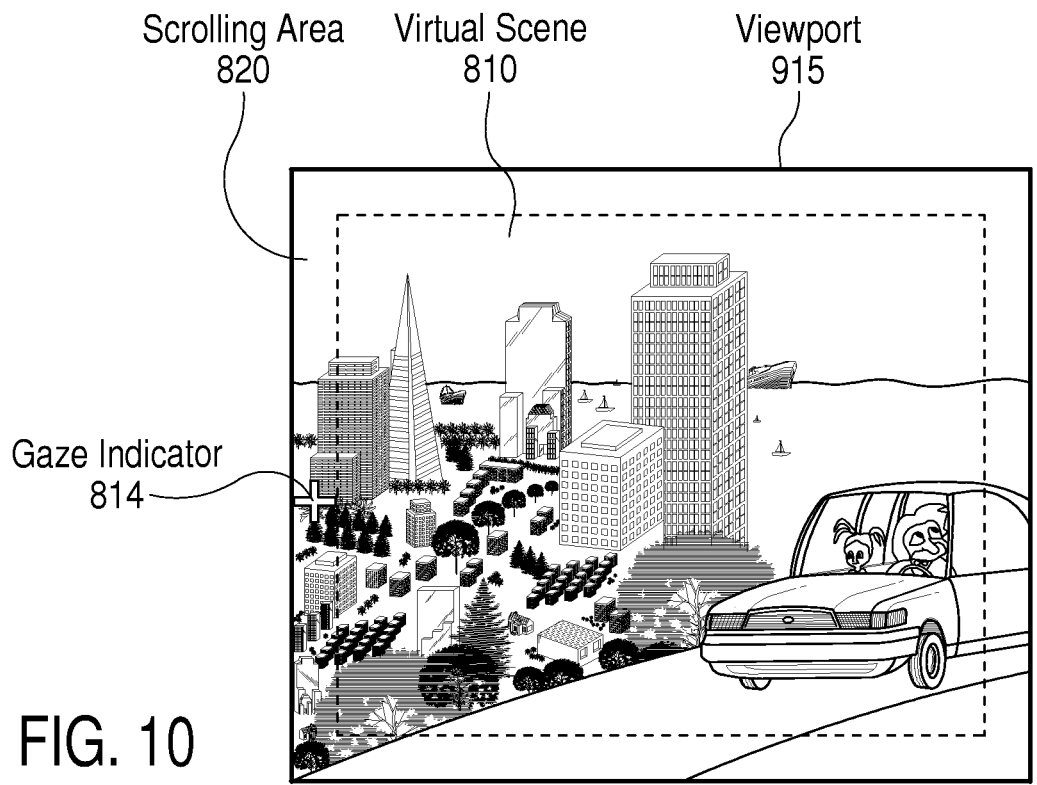
FIG. 10 illustrates an exemplary viewport with scrolling control according to embodiments of the present disclosure.

FIG. 10 illustrates an exemplary viewport with scrolling control according to embodiments of the present disclosure. As shown in FIG. 10, when the gaze indicator 814 is on the left side of the scrolling area 820, it indicates that the user intents to scroll the virtual scene 810 rightward for further view. The desired direction of camera scrolling (e.g., leftward) is in line with the location of the gaze indicator in the scrolling area 820 (e.g., left side in the scrolling area). Such an implementation is very natural and intuitive to the user.

In one or more embodiments, when the remote camera is panned or tilted to an end position, a message may be included, by the camera or by a server, in the imaging data transmitted to the contact lens as a notice that a maximum directional level has been reached. Upon receiving the message, the contact lens may project a second visual notice in the viewport to notice the user. For example, the second visual notice may be a flashing partial edge of the viewport such that the user may realize that the virtual scene may not be further scrolled. In one or more embodiments, the flashing part corresponds to the direction that the camera reaches a maximum level. For example, if the camera is directed to the uppermost position, the top edge of the viewport may flash. The flashing may be last temporality, e.g., 0.5 s, in a second predetermined color, which may or may not the same as the first predetermined color.

The user may also implement unzooming control for the remote camera. When the gaze indicator falls in the scrolling area longer than a predetermined unzooming threshold, it indicates that the user desires the camera to unzoom or zoom out for a broader view (and optionally in addition to camera panning/tilting). The contact lens may send a control request indicating an unzooming intention, and optionally a panning/tilting intention, to a remote camera. The remote camera receives the request and implements one or more setting adjustments to update captured images. Setting adjustments may comprise decreasing a zoom setting to zoom out and optionally changing a pan or tilt setting. In one or more embodiments, unzooming may start whenever the user stops gazing at the zoomed scene.

The predetermined unzooming threshold for unzooming intention may be a time interval close to zero or even as zero, such that the control request for unzooming may be transmitted immediately, or almost immediately, to minimize a delay in the whole virtual scene updating process for improved user experience.

Figure 11:
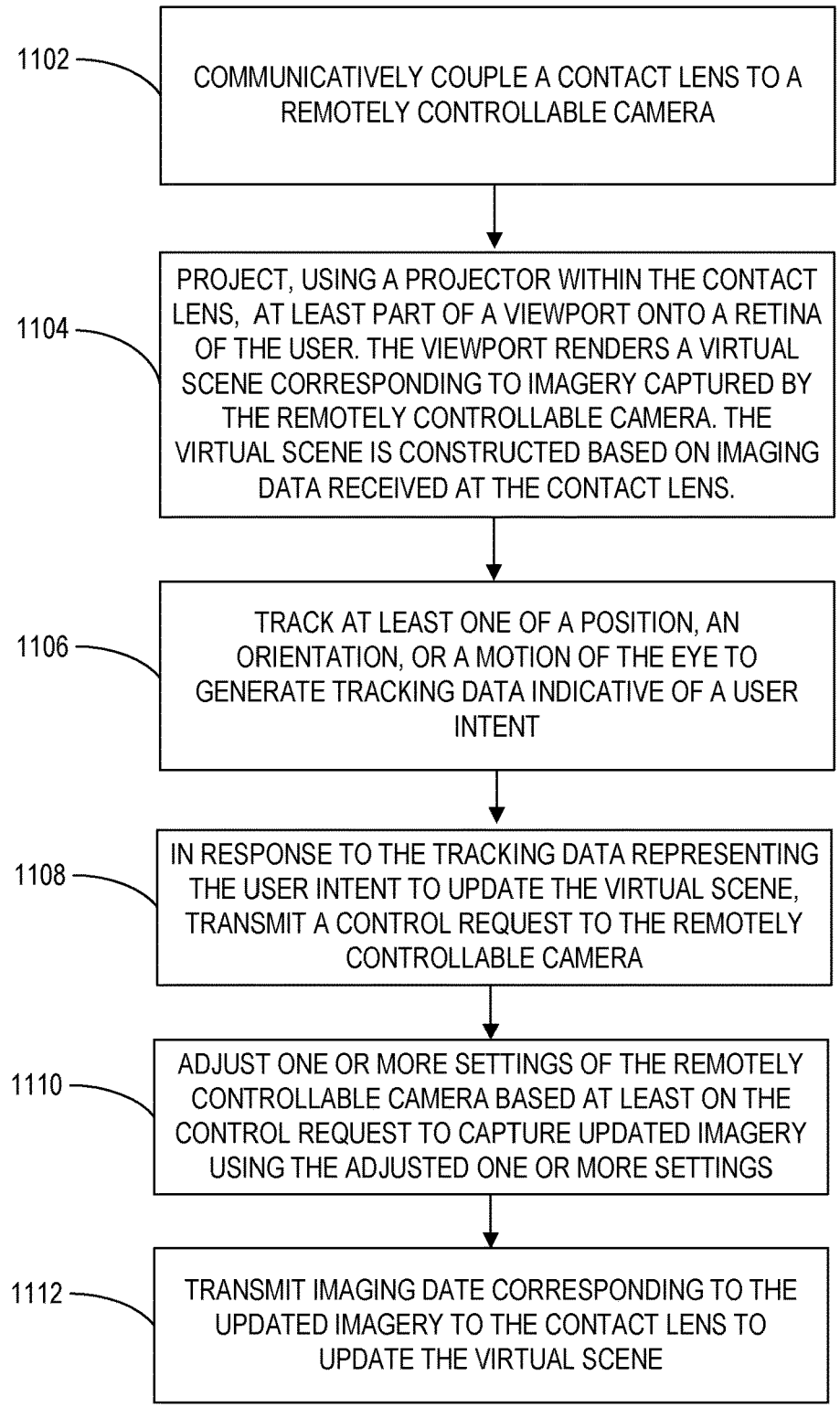
FIG. 11 illustrates a process for remote camera control according to embodiments of the present disclosure.

FIG. 11 illustrates a process for remote camera control according to embodiments of the present disclosure. Process 1100 begins, at step 1102, a contact lens communicatively couples to a remotely controllable cameras. In step 1104, upon a triggering condition being met, a projector integrated within the contact lens projects at least part of a viewport onto a retina of a user. The viewport renders a virtual scene corresponding to imagery captured by the remotely controllable camera. The virtual scene is constructed based on imaging data received at the contact lens. In one or more embodiments, the triggering condition may be a gaze point of the user falling within an activation zone, or at least one moving object being captured by the remotely controllable camera. For the former triggering condition, the contact lens activates a projector by itself. For the later triggering condition, the contact lens activates the projector per an external activation request, which is transmitted to the contact lens from the remotely controllable camera or a server coupled to the remotely controllable camera. In an example, the contact lens may be activated to project the virtual scene captured by a remotely controllable camera when a user presses a button in an accessory device or sends a voice request via the accessory device, etc. In other words, the activation of virtual scene projection onto the user's retina may be separate from eye-based remote camera control.

In step 1106, at least one of a position, an orientation, or a motion of an eye(s) is tracked, using one or more motion sensors integrated within the contact lends, to generate tracking data indicative of a user intent.

In step 1108, in response to the tracking data representing the user intent to update the virtual scene, a control request is transmitted from the contact lens to the remotely controllable camera.

In step 1110, one or more settings of the remotely controllable camera are adjusted based at least on the control request to capture updated imagery using the adjusted one or more settings. In one or more embodiments, the setting adjustment may comprise one or more settings of pan, tilt, zoom, etc.

In step 1112, imaging data corresponding to the updated imagery are transmitted to the contact lens to update the virtual scene in the viewport.

Figure 12A:
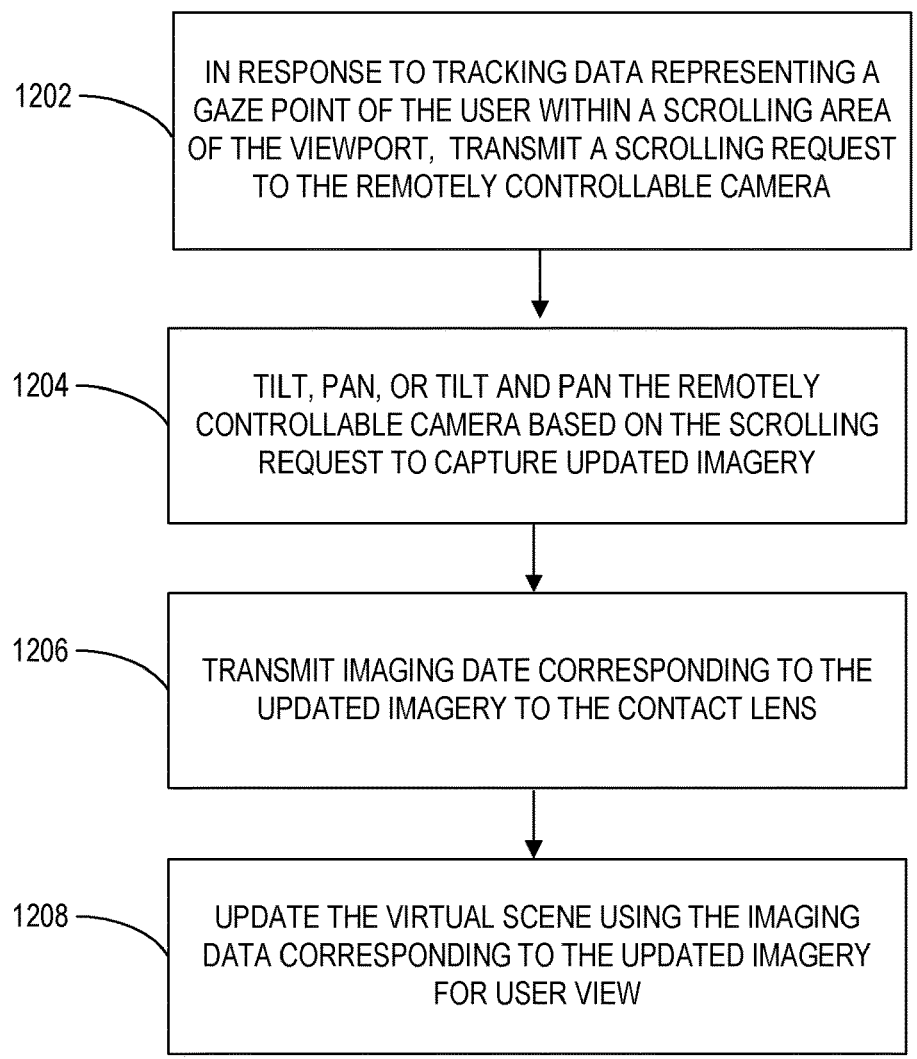
FIG. 12A illustrates a process for remote camera scrolling control projection according to embodiments of the present disclosure.

In one or more embodiments, the control request may be a scrolling request. FIG. 12A illustrates a process for remote camera scrolling control projection according to embodiments of the present disclosure. In step 1202, in response to the tracking data representing that a gaze point of the user is within a scrolling area of the viewport, a scrolling request is transmitted to the remotely controllable camera.

In step 1204, the remotely controllable camera is tilted, panned, or tilted and panned based on the scrolling request to capture updated imagery. In step 1206, imaging data corresponding to the updated imagery are transmitted to the contact lens. In one or more embodiments, a message may be transmitted together the updated imaging data when the camera has been panned and/or tilted to a maximum directional level. In step 1208, the virtual scene is updated using the imaging data corresponding to the updated imagery for user view.

Figure 12B:
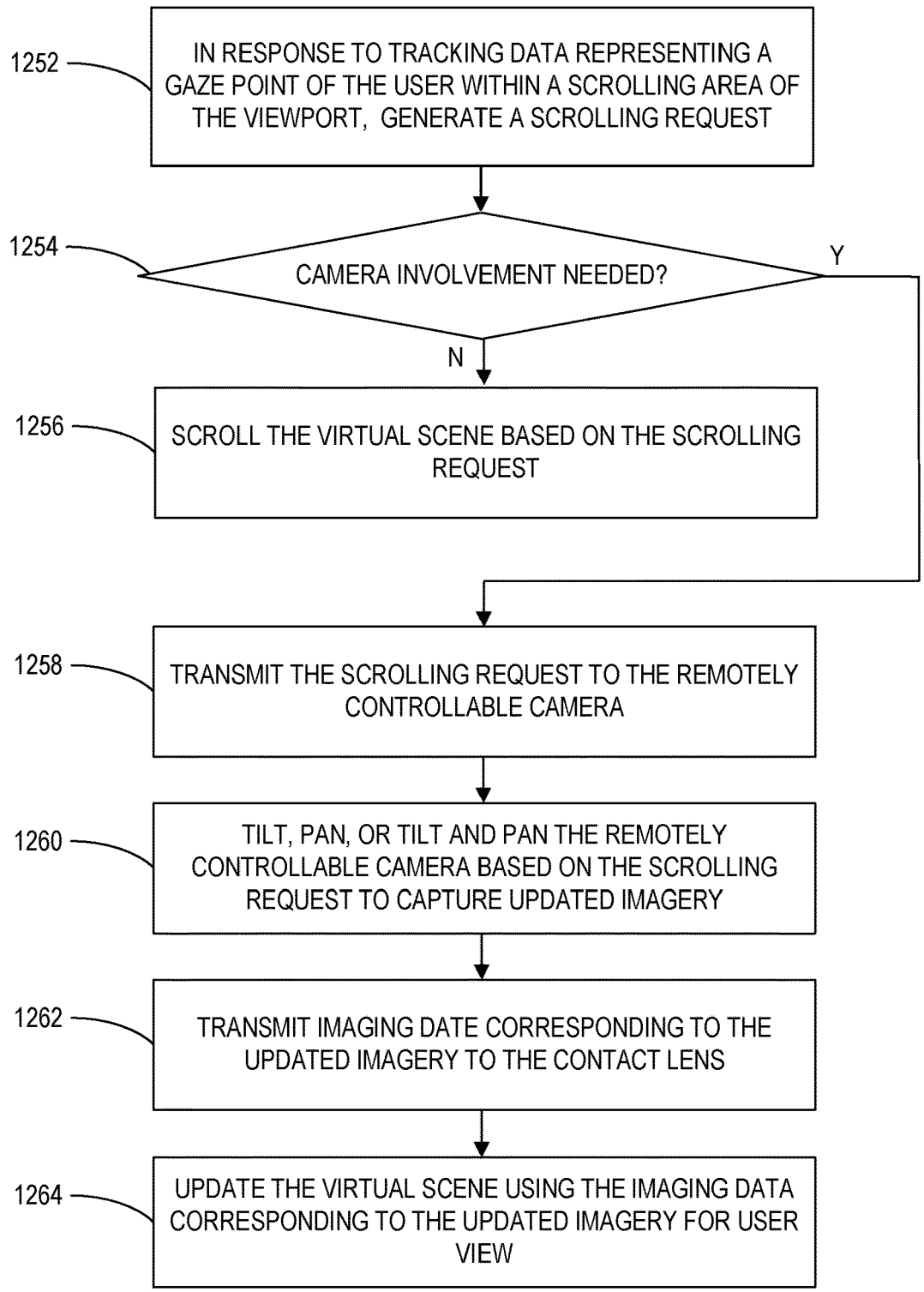
FIG. 12B illustrates an alternative process for remote camera scrolling control projection according to embodiments of the present disclosure.

FIG. 12B illustrates an alternative process for remote camera scrolling control projection according to embodiments of the present disclosure. In step 1252, in response to the tracking data representing that a gaze point of the user is within a scrolling area of the viewport, a scrolling request is generated at the contact lens.

In step 1254, instead of transmitting the scrolling request to the remotely controllable camera directly, the contact lens determines whether a camera involvement is needed to accommodate the scrolling request. The determination may be based on whether the current virtual scene can be scrolled to meet the scrolling request. In some situations, the virtual scene may not be fully rendered in the viewport. Therefore, the scrolling request may be accommodated by just scrolling the current virtual scene to reveal invisible contents, without even needing camera involvement. While in some other situations, the virtual scene rendered in the viewport may not be able to scroll further, camera involvement would be necessary to update virtual scene to meet the scrolling request.

In step 1256, responsive to camera involvement not needed, the contact lens scrolls the virtual scene based on the scrolling request. The scrolling direction of the virtual scene may be opposite to the location of the gaze indicator in the scrolling area. For example, when the gaze indicator is at an upper position, the virtual scene is scrolled downward.

In step 1258, responsive to camera involvement needed, the scrolling request is transmitted to the remotely controllable camera. In step 1260, the remotely controllable camera is tilted, panned, or tilted and panned based on the scrolling request to capture updated imagery. In step 1262, imaging data corresponding to the updated imagery are transmitted to the contact lens. In one or more embodiments, a message may be transmitted together the updated imaging data when the camera has been panned and/or tilted to a maximum directional level. In step 1264, the virtual scene is updated using the imaging data corresponding to the updated imagery for user view.

Figure 13:
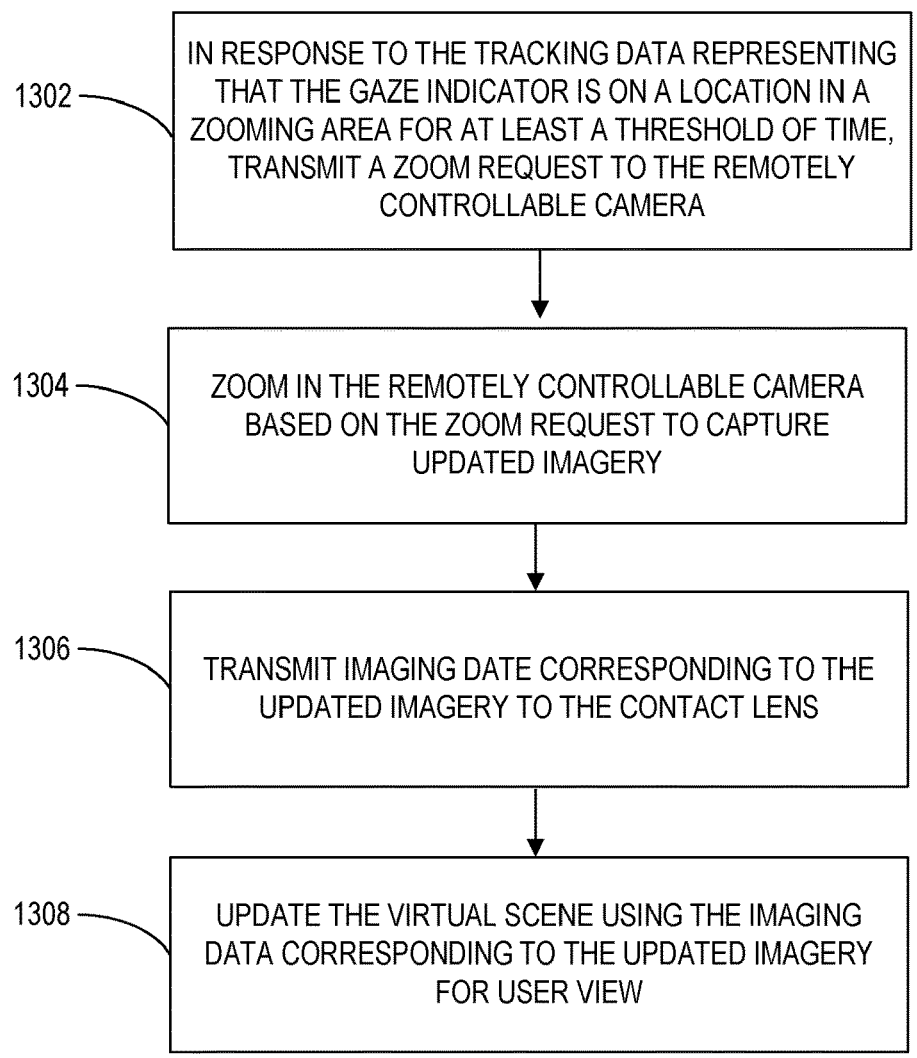
FIG. 13 illustrates a process for remote camera zoom control projection according to embodiments of the present disclosure.

In one or more embodiments, the control request may be a zoom request. FIG. 13 illustrates a process for remote camera zoom control projection according to embodiments of the present disclosure. In step 1302, in response to the tracking data representing that the gaze indicator is on a location in a zooming area, defined as an area other than the scrolling area in the viewport, for at least a threshold of time, a zoom request is transmitted to the remotely controllable camera. The threshold of time may be a value close to zero (e.g., 0.1 s) or zero to minimize delay in the overall virtual scene updating process.

In step 1304, the remotely controllable camera is zoomed in based on the zoom request to capture updated imagery. In step 1306, imaging data corresponding to the updated imagery are transmitted to the contact lens. In one or more embodiments, a message may be transmitted together the updated imaging data when the camera has been panned and/or tilted to a maximum directional level. In step 1308, the virtual scene is updated using the imaging data corresponding to the updated imagery for user view.

One skilled in the art shall understand the processes shown in FIG. 12A/12B and FIG. 13 may be implemented separately or jointly. In other words, a contact lens may send a control request with intention for both scrolling and zooming. The camera may adjust both zoom setting and pan/tilt setting for virtual scene capturing. In one or more embodiments, when the camera reaches a zoom limit and a directional position limit, imaging data of the updated scene may be transmitted together with a message for a maximum zoom level and a message for a maximum directional level. In this circumstance, the virtual scene may have an entire edge and a partial edge (corresponding to the direction reaching the maximum level) flashing alternatively.

A user may request a zoom lock such that the camera may have a fixed zoom level for imagery capturing. In one or more embodiments, the contact lens may project a zoom-lock icon, which may show different status (e.g., color etc.) depending on whether camera is in a zoom-lock mode or a zoom-unlock mode.

Figure 14A:
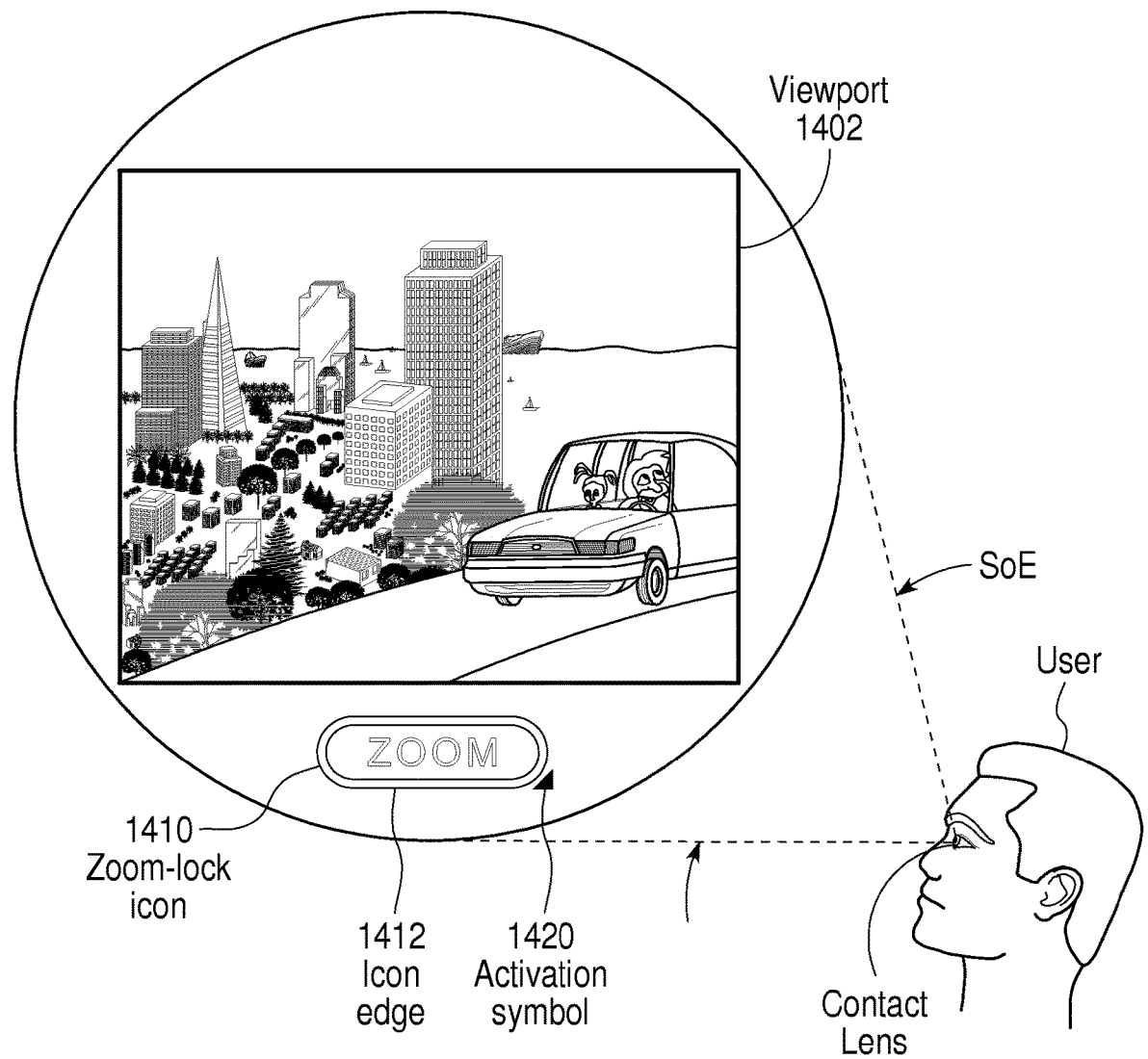
FIG. 14A illustrates an exemplary viewport and a zoom-lock icon according to embodiments of the present disclosure.

FIG. 14A illustrates an exemplary viewport 1402 and a zoom-lock icon 1410 according to embodiments of the present disclosure. The zoom-lock icon 1410 may be a text label (e.g., a "ZOOM" label as shown in FIG. 14A) surrounded by an icon edge 1412. The icon edge 1412 may be rendered in different colors or styles to identify different zoom-lock statuses. Additionally, an activation symbol 1420 may be rendered next to the zoom-lock icon 1410.

Figure 14B:
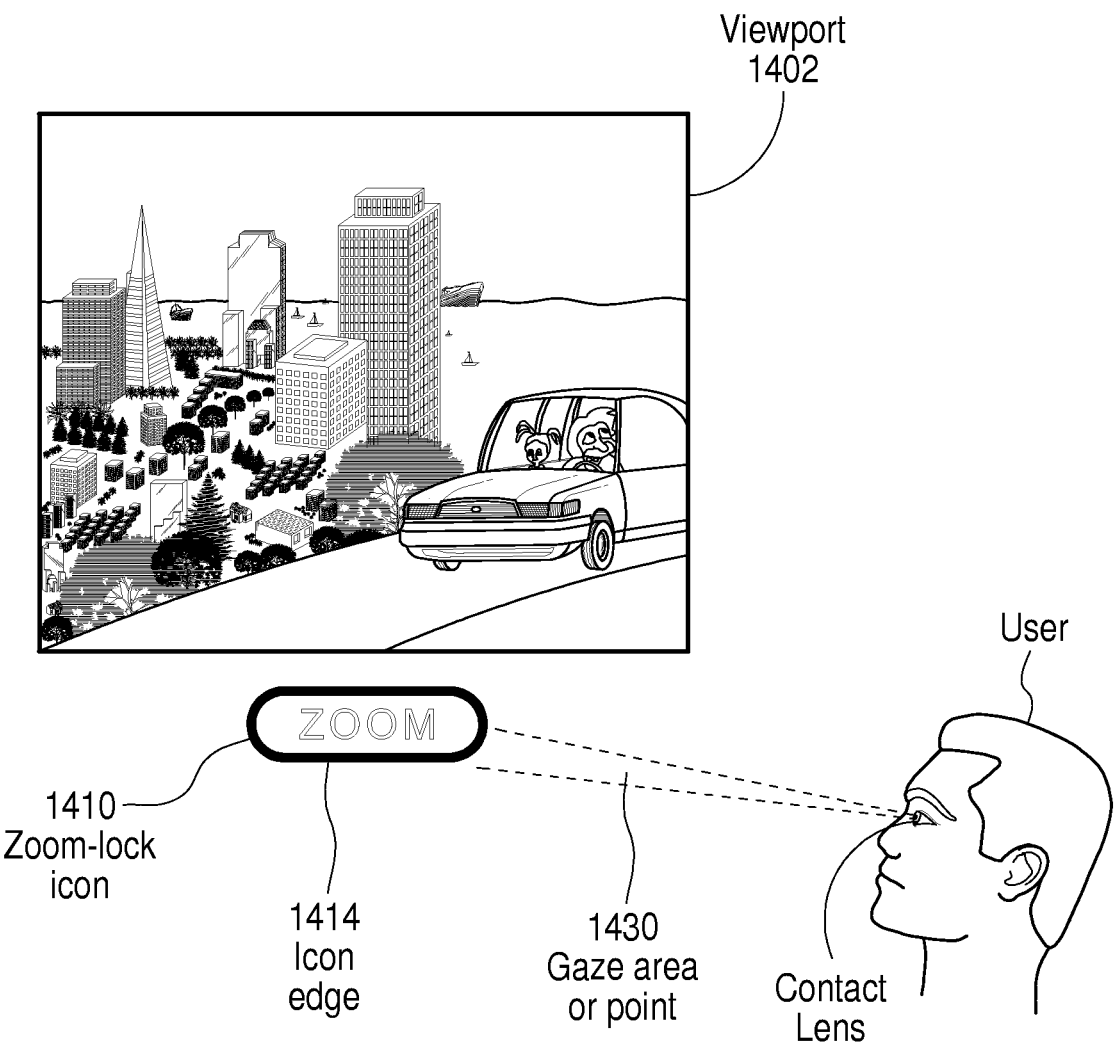
FIG. 14B illustrates an exemplary viewport with a user gazing the zoom-lock icon according to embodiments of the present disclosure.

Upon a gaze area or a gaze point 1430 falls on the zoom-lock icon 1410, as shown in FIG. 14B, the activation symbol 1420 may appear next to the zoom-lock icon 1410 and may be rendered in a bright color to simulate a "glowing" visual effect for user attention. When the gaze point 1430 is away from the activation symbol 1420, the activation symbol 1420 starts dimming to indicate that the zoom-lock icon 1410 is not visually engaged for zoom-lock or zoom-unlock activation.

Figure 14C:
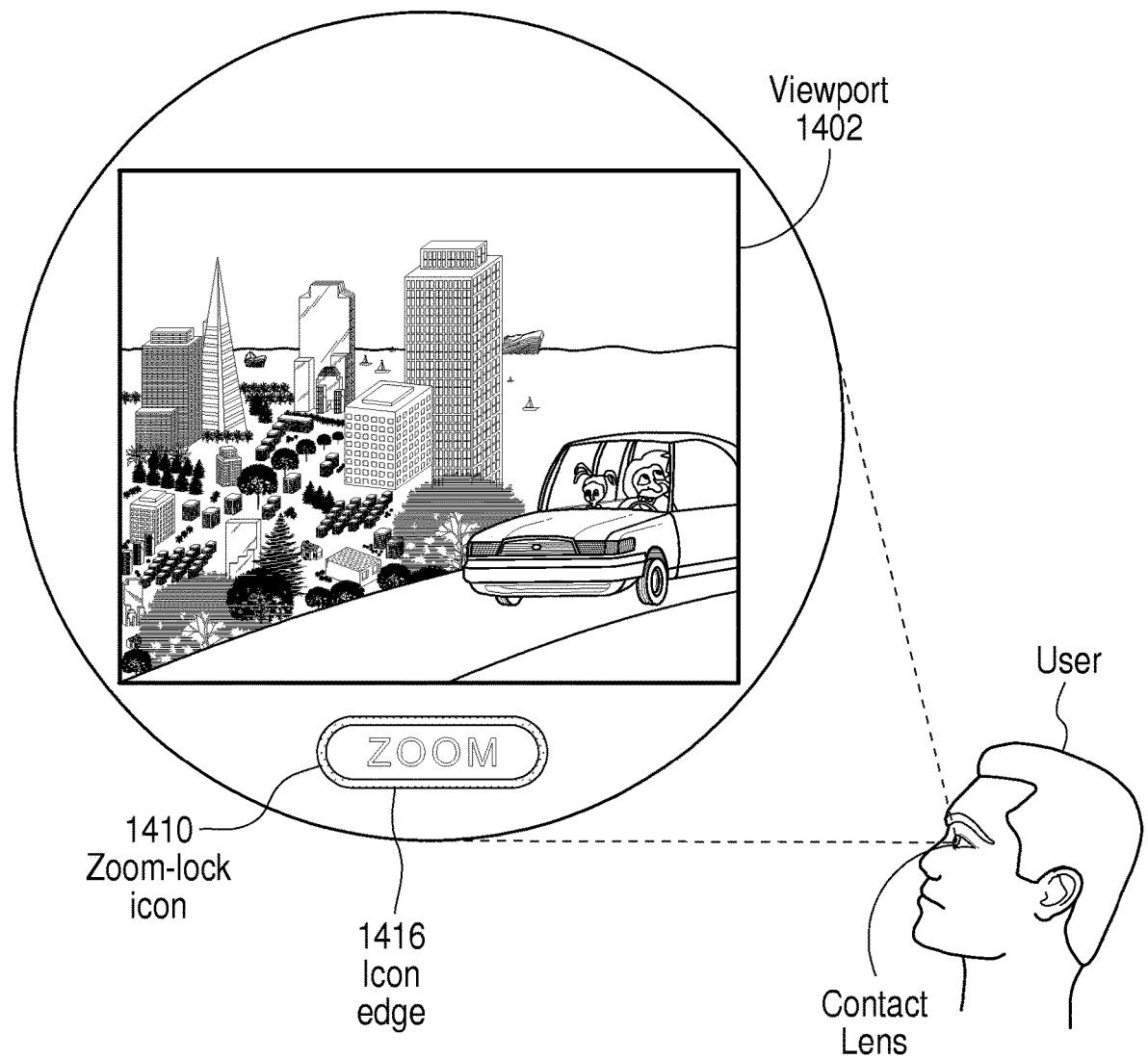
FIG. 14C illustrates an exemplary viewport with the zoom-lock icon showing a zoom-lock status according to embodiments of the present disclosure.

Once the activation symbol 1420 appears, a user may look at the activation symbol 1420 (with the user's gaze point 1430 falling on the activation symbol 1420) to activate a zoom-lock setting change. A sweep animation for at least part of the zoom-lock icon 1410, e.g., the icon edge 1412, may start to provide a dynamic visual feedback for user awareness. During the sweep animation, a transient change may occur for the icon edge 1412. For example, the icon edge 1412 may be rendered in a brighter color such that the "glowing" visual effect appears to be passed from the activation symbol 1420 to the icon edge 1412. When the sweep animation ends, the activation symbol 1420 may disappear and the icon edge 1412 may be changed from a solid color (shown as the icon edge 1414 in FIG. 14B) into a dotted pattern (shown as the icon edge 1416 in FIG. 14C). When the zoom-lock setting change is activated on the viewport side, the contact lens may stop sending a zoom request in response to user gazing, such that a broad view of the virtual scene rendered in the viewport may be maintained even though the user is gazing a location or an object in the virtual scene. Alternatively, when the zoom-lock setting change is activated on the viewport side, a changing request may also be transmitted from the contact lens to a communicatively coupled camera (if the contact lens determines that a camera involvement is needed), such that the camera may adjust one or more camera settings accordingly, e.g., turning off auto-exposure, turning off auto-focus, or maintaining a given focal distance, etc.

Figure 15:
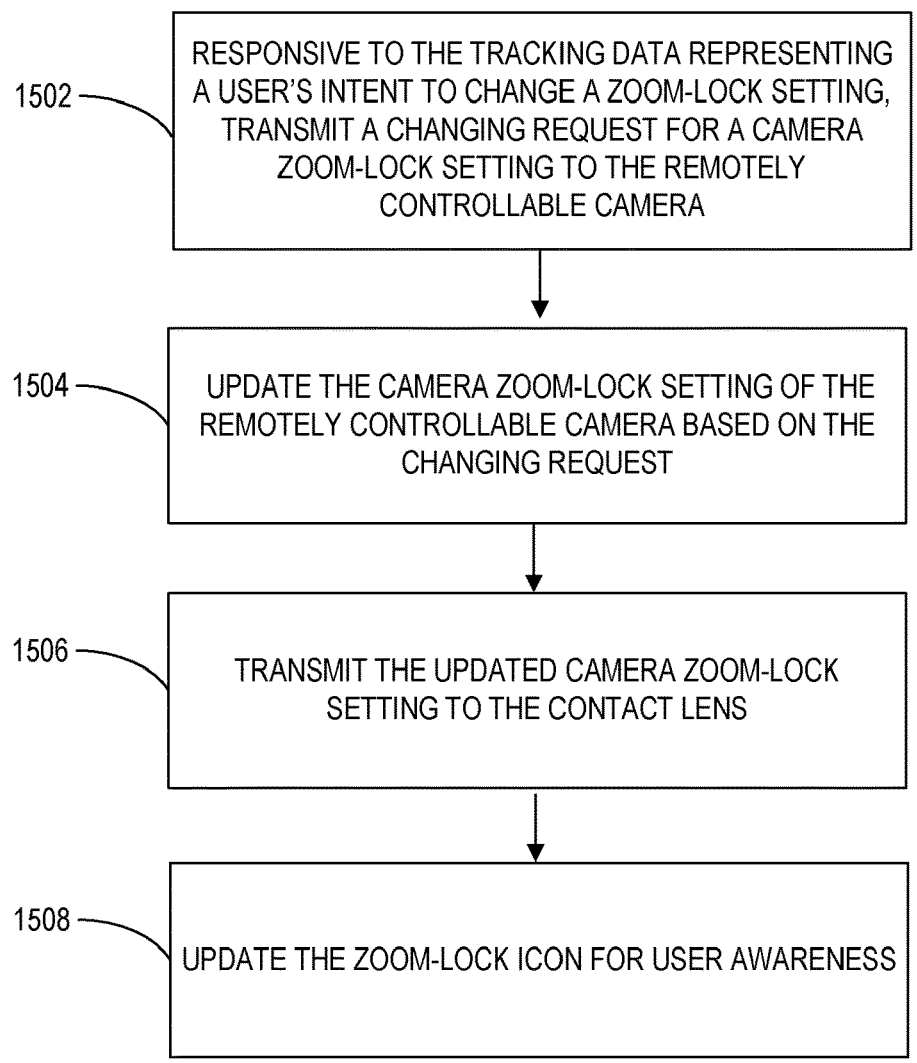
FIG. 15 illustrates a process for remote camera zoom lock/unlock control projection according to embodiments of the present disclosure.

FIG. 15 illustrates a process for remote camera zoom lock/unlock control according to embodiments of the present disclosure. In step 1502, responsive to the tracking data representing a user's intent to change a camera zoom-lock setting, a changing request for a camera zoom-lock setting is transmitted to the remotely controllable camera. In one or more embodiments, the changing request is a zoom-lock request to lock a zoom setting when the camera is currently in a zoom-unlock status, or a zoom-unlock request to unlock a zoom setting when the camera is currently in a zoom-lock status.

In step 1504, the remotely controllable camera updates the camera zoom-lock setting based on the changing request. If the changing request is a zoom-lock request, the came has its zoom-lock setting updated as a zoom-lock status such that the zoom level is fixed. If the changing request is a zoom-unlock request, the came has the zoom-lock setting updated as a zoom-unlocked status such that the zoom level is adjustable.

In step 1506, the remotely controllable camera transmits an updated zoom-lock setting to the contact lens. In step 1508, the contact lens updates the zoom-lock icon for user awareness. In one or more embodiments, the zoom-lock icon may be updated using a sweep animation for at least part of the zoom-lock icon.

D. Embodiments of Moving Object Tracking Control

Figure 16:
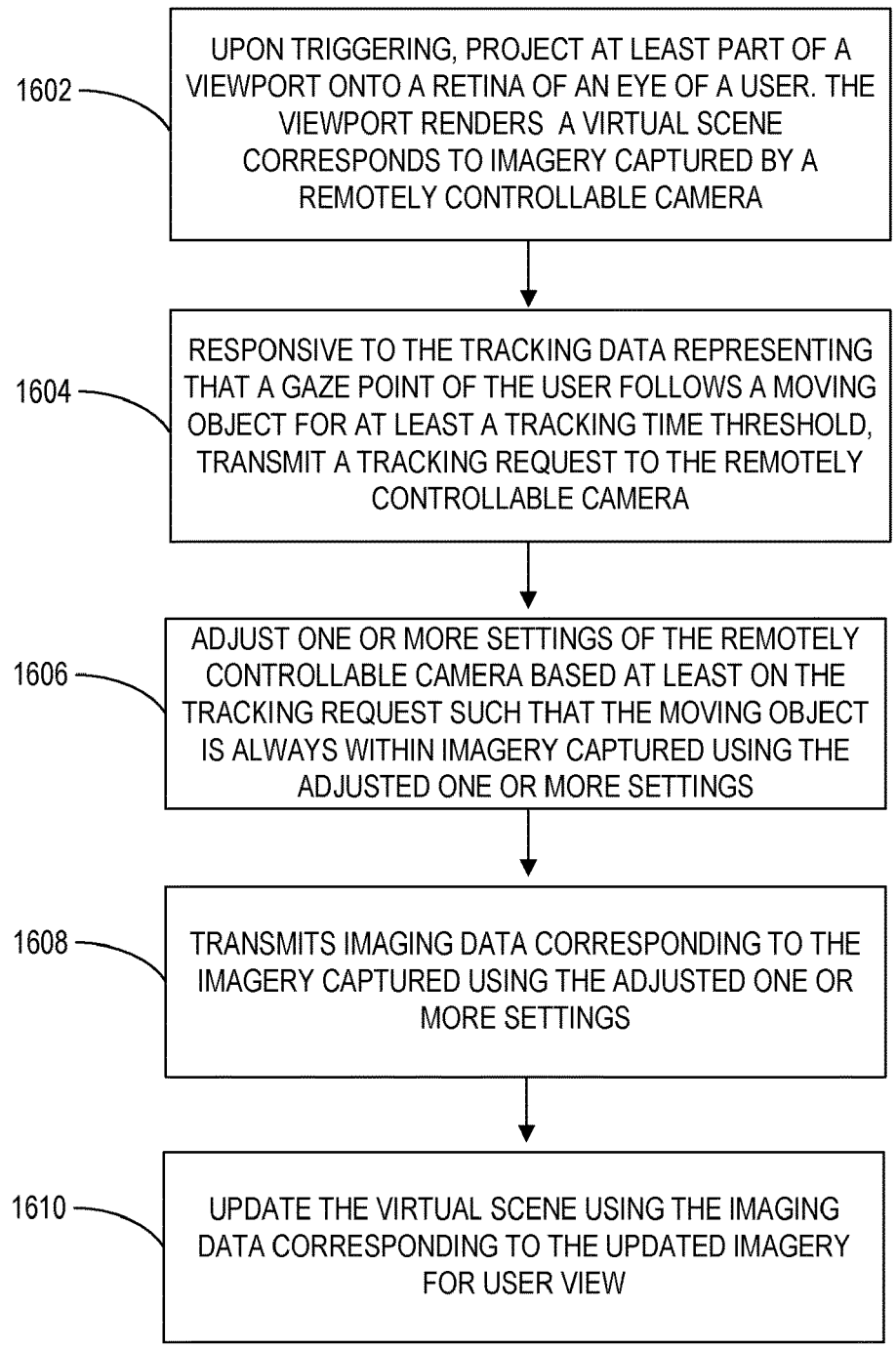
FIG. 16 illustrates a process for remote camera tracking control projection according to embodiments of the present disclosure.

In one or more embodiments, the control request may be a tracking request. FIG. 16 illustrates a process for remote camera tracking control projection according to embodiments of the present disclosure.

In step 1602, the contact lens projects, upon a triggering condition being met, at least part of a viewport onto a retina of a user. The virtual scene renders a virtual scene corresponding to imagery captured from a remotely controllable camera. The virtual scene is constructed based one imaging data received at the contact lens. In one or more embodiments, the triggering condition may be a gaze point of the user falling within an activation zone, or at least one moving object being captured by the remotely controllable camera. For the former triggering condition, the contact lens activates a projector by itself. For the later triggering condition, the contact lens activates the projector per an external activation request, which is transmitted to the contact lens from the remotely controllable camera or a server coupled to the remotely controllable camera.

In step 1604, in response to the tracking data representing that a gaze point of the user follows a moving object in the viewport for at least a tracking time threshold (e.g., 0.5*s*), the contact lens transmits a tracking request to the remotely controllable camera.

In step 1606, the remotely controllable camera adjusts one or more settings based at least on the tracking request such that the moving object is always within (preferable in the center) imagery captured using the adjusted one or more settings. In one or more embodiments, adjusting the one or more settings comprises adjusting a zoom setting such that the moving object occupies at least a predetermined percentage (e.g., 30%) in the virtual scene to facilitate user tracking.

In step 1608, the remotely controllable camera transmits imaging data corresponding to the imagery captured using the adjusted one or more settings to the contact lens. In step 1610, the virtual scene is updated using the imaging data for user view.

Such an eye-based moving object tracking control may be advantageous in certain applications. For example, in a law enforcement situation, a user may need a silent control, or be in a very noisy ambient environment where voice-based control may be subject to a noise interference. When a gaze point of the user follows the moving object in the viewport for at least a threshold of time, at least a part of the moving object may be highlighted (or enhanced for a sharper contract with an ambient environment of the moving object) to facilitate user tracking as long as the user's gaze point is on the moving object. Once the gaze point is away from the moving object, the highlight is removed.

E. Embodiments of System Implementation

Figure 17:
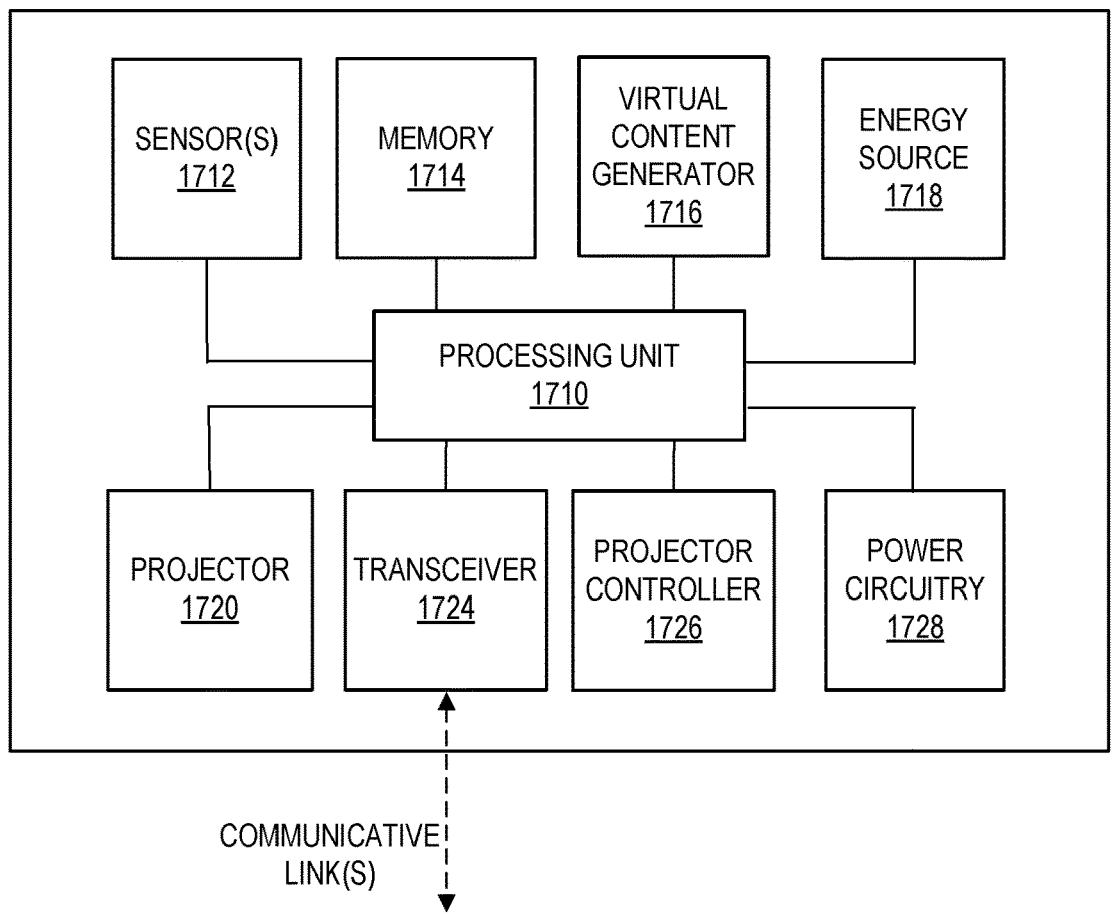
FIG. 17 illustrates a system block diagram of a contact lens for remote camera selection and control according to embodiments of the present disclosure.

FIG. 17 illustrates a system block diagram of a contact lens for remote camera selection and control according to embodiments of the present disclosure. Contact lens comprises a processor(s) 1710 that is communicatively coupled to and coordinate functions of individual modules, which may be modules of hardware, software or a combination of hardware and software. These other modules may include one or more motion sensors 1712, a memory 1714, a virtual object generator 1716, an energy source 1718, a projector 1720, a transceiver 1724, a projector controller 1726, and a power circuitry 1728.

In operation, the transceiver 1724 establishes a communicative link to a remote controllable camera to receive imaging data and transmit control requests. At least part of a virtual scene, based on the received imaging data, may be projected by the projector 1720 onto a retina of the user, under the control of the projector controller 1726. The projector controller 1726 may project one or more additional virtual contents, e.g., icons or indictors, etc., generated by the virtual content generator 1716, besides the virtual scene. The user's eye interaction with the virtual scene and the additional virtual contents may be monitored by the one or more motion sensors 1712, and analyzed by the processing unit 1710. A control request may be generated and transmitted from the contact lens through the transceiver 1724. The control request indicates the user's intention, which may be an access to a remote camera, one or more camera setting adjustment request, etc.

The memory 1714 stores executable logic that may be accessible and executable by the processor 1714 to perform desirable imaging processing, user intention analysis, and other applicable operations. The energy source 1718 may be a battery, a capacitor, or an energy harvest unit to receive energy externally via wireless charging. The power circuitry 1728 may couple to the energy source 1718 for power distribution and management.

One skilled in the art shall understand the eye tracking may also be implemented using external sensors, e.g., sensors within glasses, goggles, a VR headset, etc. For example, a user may wear a goggle with built-in cameras to detect eye movement or orientation. The goggle or a VR headset may comprise an integrated miniature video projector that projects images on the user's retina, or use miniature display(s) contained within the goggle or the VR headset. Accordingly, one or more embodiments of eye-based remote camera interaction described in the present application may be implemented using a wearable electronic device other than a contact lens.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for interacting with a remote camera via a contact lens, the method comprising:
estimating the orientation of a user's eye based on measurements obtained by one or more sensors disposed within the contact lens;
identifying a gaze point of the user from the estimated orientation;
sending a communication request to access the remote camera in response to the gaze point falling within an activation zone;

receiving at the contact lens image data from the remote camera;

projecting onto a retina of the user, via a femtoprojector contained within the contact lens, at least part of a viewport which renders the image data; and stopping projecting the at least part of the viewport in response to a stop condition being met.

2. The eye-based controlling method of claim 1 wherein the activation zone is a subset of a range of eye motion.

3. The eye-based controlling method of claim 2 wherein the activation zone comprises multiple activation areas with each activation area associated with a corresponding remote camera among a plurality of remote cameras.

4. The eye-based controlling method of claim 3 wherein in response to the gaze point of the user being within an activation area among the multiple activation areas, the remote camera to be accessed is the corresponding remote camera associated the activation area.

5. The eye-based controlling method of claim 2 wherein the projection stop condition is that the gaze of the user falling within a deactivation area within the activation zone.

6. The eye-based controlling method of claim 1 wherein the image data is transmitted to the lens from the camera directly, via a cloud server, or via an accessory device.

7. An eye-based camera controlling method comprising:
communicatively coupling a contact lens to a remotely controllable camera;

projecting onto a retina of a user, via a femtoprojector contained within the contact lens, at least part of a viewport, the viewport renders a virtual scene corresponding to imagery captured by the remotely controllable camera, the virtual scene is constructed based on imaging data received at the contact lens;

tracking, using one or more sensors disposed within the contact lens, at least a gaze point of the user to generate tracking data indicative of a user intent;

transmitting, from the contact lens, a control request to the remotely controllable camera in response to the tracking data representing the user intent for virtual scene updating;

adjusting one or more settings of the remotely controllable camera based at least on the control request to capture imagery using the adjusted one or more settings; and transmitting updated imaging data corresponding to imagery captured using the adjusted one or more settings to the contact lens for virtual scene updating.

8. The eye-based camera controlling method of claim 7 wherein the viewport comprises a scrolling area, defined as a predetermined area along an edge of the viewport, and a gaze indicator visually indicating the gaze point of the user.

9. The eye-based camera controlling method of claim 8 wherein the control request is a scrolling request when the gaze point of the user falls in the scrolling area, the control request is transmitted to the remotely controllable camera if the contact lens determines that a camera involvement is needed to accommodate the scrolling request, the virtual scene rendered in the viewport is scrolled if the contact lens determines that a camera involvement is not needed to accommodate the scrolling request.

10. The eye-based camera controlling method of claim 9 wherein the adjusting one or more settings is to pan, tilt, or pan and tilt the remotely controllable camera based on the scrolling request.

11. The eye-based camera controlling method of claim 10 wherein the remotely controllable camera is panned, tilted, or panned and tilted, in a direction in line with the location of the gaze indicator in the scrolling area.

12. The eye-based camera controlling method of claim 8 wherein the control request is a zoom request when the user's gaze remains on a location in an area other than the scrolling area in the viewport for at least a threshold of time.

13. The eye-based camera controlling method of claim 12 wherein adjusting one or more settings comprises zooming in the remotely controllable camera based on the zoom request.

14. The eye-based camera controlling method of claim 7 wherein the femtoprojector further projects a zoom-lock icon, in response to the gaze point of the user falling on the zoom-lock icon, an activation symbol appears in proximity to the zoom-lock icon, upon the gaze point of the user falling on the activation symbol, a zoom-lock setting change is activated.

15. The eye-based camera controlling method of claim 14 wherein when the zoom-lock setting change is activated,
the contact lens stops sending a zoom request in response to user gazing; or
a changing request for one or more camera settings is transmitted to the remotely controllable camera if the contact lens determines that a camera involvement is needed.

16. The eye-based camera controlling method of claim 7 wherein the changing request is a tracking request responsive to the tracking data representing that the gaze point of the user follows a moving object on the virtual scene for at least a tracking time threshold, the tracking request is transmitted to the remotely controllable camera for tracking the moving object.

17. The eye-based camera controlling method of claim 16 wherein adjusting one or more settings of the remotely controllable camera comprises one of more of panning, tilting, and zooming the remotely controllable camera such that the moving object is within imagery captured using the adjusted one or more settings.

18. A contact lens comprising:
a transceiver to communicatively couple the contact lens to a remotely controllable camera;
a femtoprojector within the contact lens to project at least part of a viewport onto a retina of a user of the contact lens, the viewport renders a virtual scene corresponding to imagery captured by the remotely controllable camera, the virtual scene is constructed based on imaging data received at the contact lens; and
one or more sensors disposed within the contact lens to track at least a gaze point of the user to generate tracking data indicative of a user intent, responsive to the tracking data representing the user intent for virtual scene updating, the contact lens is operative to:
transmit a control request to the remotely controllable camera for adjusting one or more camera settings to capture imagery using the adjusted one or more settings; and
receive imaging data corresponding to imagery captured using the adjusted one or more settings to the contact lens for virtual scene updating.

19. The contact lens of claim 18 wherein the femtoprojector stops projection of the at least part of the viewport when the gaze of the user falls within a deactivation area associated with the range of eye motion.

20. A method for remote camera interaction, the method comprising:
tracking at least one of a position, an orientation, or a motion of a user's eye to generate tracking data, wherein eye tracking is performed using one or more sensors integrated within a wearable electronic device, the tracking data being used to identify one or more of a position, an orientation, and a gaze point of a the user's eye;

responsive to the gaze point falling within an activation zone associated with a range of eye motion, sending a communication request to access a remote camera;

receiving, at the wearable electronic device, imaging data corresponding to imagery captured by the remote camera;

rendering, using a projector or a display within the wearable electronic device, at least part of a viewport for user view, the viewport renders a virtual scene constructed based on the imaging data received at the wearable electronic device; and responsive to the gaze of the user falling within a deactivation area associated with the range of eye motion, stopping projection of the at least part of the viewport.

* * * * *